United States Patent [19]

Bries et al.

[11] Patent Number: 5,110,843
[45] Date of Patent: May 5, 1992

[54] ABSORBENT, NON-SKINNED FOAM AND THE METHOD OF PREPARATION

[75] Inventors: James L. Bries, Cottage Grove; Vickie A. Johnston, Lake Elmo, both of Minn.

[73] Assignee: Minnesota Mining and Manufacturing Company, St. Paul, Minn.

[21] Appl. No.: 694,111

[22] Filed: May 1, 1991

[51] Int. Cl.$^5$ .............................................. C08G 18/14
[52] U.S. Cl. .................................. 521/159; 427/209; 427/373; 428/160; 428/304.4; 428/309.9; 428/316.6; 428/318.4; 428/318.6; 428/319.3; 428/423.1
[58] Field of Search ............... 521/159; 427/209, 373; 428/160, 304.4, 309.9, 316.6, 318.4, 318.6, 319.3, 423.1

[56] References Cited

U.S. PATENT DOCUMENTS

| | | | |
|---|---|---|---|
| 2,916,464 | 12/1959 | Ebneth et al. | 528/55 |
| 3,808,162 | 4/1974 | Allen et al. | 528/75 |
| 3,903,232 | 9/1975 | Wood et al. | 528/76 |
| 4,137,200 | 1/1979 | Wood et al. | 528/77 |
| 4,377,645 | 3/1983 | Guthrie et al. | 528/85 |
| 4,384,050 | 5/1983 | Guthrie | 528/83 |
| 4,384,051 | 5/1983 | Guthrie | 528/52 |
| 4,638,017 | 1/1987 | Larson et al. | 528/53 |
| 4,738,992 | 4/1988 | Larson et al. | 528/76 |

OTHER PUBLICATIONS

Polyurethane Handbook, Chap. 7, (sec 7.1) G. Oertel, 1985.
Hypol Plus ™ Foamable Hydrophilic Prepolmers, Grace, Organic Chemicals Division, W. R. Grace & Co., Lexington, Mass. 02173, 1985.

*Primary Examiner*—Maurice J. Welsh
*Attorney, Agent, or Firm*—Gary L. Griswold; Walter N. Kirn; Carolyn V. Peters

[57] ABSTRACT

A polyurethane foam comprising a convolution of connected passages and a three dimensional vesicular, porous surface structure, substantially without an outer layer skin is described. An absorbent article is further described comprising a substrate and at least a single layer of the polyurethane foam. The process to produce the polyurethane foam comprises the steps of:

(a) coating a substrate with a reaction mixture capable of reacting to form a polyurethane foam;
(b) immersing the coated substrate into a liquid bath comprising water and a catalyst, for a time period sufficient to effect reaction of the reaction mixture; and
(c) removing the coated substrate from the liquid bath.

18 Claims, 12 Drawing Sheets

ABSORBENT, NON-SKINNED FOAM AND THE METHOD OF PREPARATION

BACKGROUND OF THE INVENTION

1. Field of the Invention

The present invention relates to foams, articles containing foams, and methods for making those foams and articles, and more particularly to foams that are skinless and to the method of making said skinless foams.

2. Background of Related Art

Foams and articles containing foams can be prepared from many different chemical classes of materials and by many different processes. Organic polymeric film forming materials can be made into foams by processes that inherently liberate gases as a by-product of the polymerization reaction. Such polymeric materials can also be converted into foams by the addition of blowing agents (gas liberating agents) or gas injection into the reaction mass or softened states (molten, solution, etc.) of the polymer. The expanding gases form voids, cells, vesicles, or bubbles within the polymer mass.

Polyurethane polymeric materials such as those formed from organic polyisocyanates and polyhydric alcohols or polyols are a particularly desirable polymeric system for the production of foam materials. U.S. Pat. No. 3,808,162 describes polymers formed by reacting at least one polyol and at least one polyisocyanate in the presence of a particular catalyst system. Suitable polyisocyanates can be represented by the formula

$$R(NCO)_n$$

wherein R is a polyvalent organic group, for example, aliphatic, cycloaliphatic, aromatic, heterocyclic, heteroaliphatic, and/or combination thereof, and n is an integer of 2 to 5.

The formula

$$R^1(OH)_m$$

represents suitable polyols wherein $R^1$ is one or more polyvalent organic groups selected from low molecular weight aliphatic groups and polymeric groups having an average molecular weight from 14 to 8000 and m is an integer of 2 to 5.

Characteristics of polyurethane, such as hardness and elasticity, can be controlled within relatively close limits by controlling the amount of crosslinking. The inclusion of trifunctional or higher polyfunctional components into the reaction mixture in predetermined amounts, or by building such further functionality into the isocyanate or the polyol reactants of the system to provide a functionality greater than two can produce a cross-linked elastomer. Thus, a small amount of a triol or other polyol such as 1,2,6-hexanetriol, pentaerythritol, trimethylol propane, glycerol, or polymeric compounds having more than two hydroxyls per molecule may be used. In addition to or in place of a polyol, the polyfunctional component can be a small amount of a triisocyanate or a polyisocyanate of greater functionality, such as that provided by the reaction of tolylene diisocyanate with trimethylol propane as mentioned above or with any of the aforementioned polyols. Typically, the amount of trifunctional component used is in the range of 1 to 10%, depending on the hardness desired and the average molecular weight of the crosslinking component used. Generally, the lower the equivalent weight and the greater the amount of the crosslinking component used, the harder is the polyurethane obtained.

The properties of the polyurethane foam may be greatly varied by selecting the backbone component, e.g., the polyol, for its possession of particular properties. The backbone or core component of the polymer may be selected for its flexibility, rigidity, hydrophilicity, oleophilicity (hydrophobicity), thermal stability, solvent resistance, etc. Some degree of backbone component properties can be carried into the polyurethane. U.S. Pat. Nos. 3,903,232; 4,137,200; 4,377,645; 4,384,050; and 4,384,051 describe examples of foams that have properties based in part upon the selection of the backbone component and the polyisocyanate.

A skin is formed on the exposed surface of polyurethane foam during conventional foaming processes. Beneficially, the skin can prevent ready penetration of materials, such as water into the body of the foam. For example, water flotation devices are fabricated from polyurethane since the skin prevents penetration of water into the cells of the foam. The skin of a polyurethane foam is a distinct area, a continuous film that gives an impression of a smooth tough surface. The cross section of conventionally processed foams are typically characterized by an abrupt change from a high density skin to a cellular, less dense core. Although this outer surface may be interrupted by pores and craters, the average density of the skin is substantially greater than the density of the inner cellular core. The film component of the surface layer of skin of the foam usually comprises at least 25% of the total surface area, more usually more than 50% or 75% of the total surface, and can easily comprise more than 90% up to 100% of the surface. *Polyurethane Handbook* Chap. 7 (sec 7.1) (G. Oertel 1985).

However, the same skin that prevents water penetration is undesirable, when using the polyurethane foam for its absorbing properties. To beneficially utilize the absorbing properties, that is, to access the body of the foam, the skin component of the foam needs to be removed. "Skiving" is a method that results in the physical removal of the skin layer by cutting the surface away from the core. Removal of the skin from the foam necessitates additional process operations, while contributing to costs and raw material wastes. However, skiving does leave an effectively planar, two dimensional surface where the skin has been removed.

SUMMARY OF THE INVENTION

The present invention provides a skinless polyureaurethane foam that is formed by coating a reaction composition onto a substrate and then immersing the coated substrate in a liquid bath until foam expansion of the prepolymer composition is completed. The reaction composition, also referred to as "the feed," comprises an isocyanate functional reaction mixture, and optionally a surfactant. A substrate may become a permanent component of the product, or it may be separated from the foam when the reaction has been completed.

Immersing the coated substrate into the bath produces a foam consisting of a convolution of connected passages rather than a mass of open or closed cells. The resulting foam has a highly porous surface structure that is absorbent and is substantially without a surface layer skin. In appearance the skinless surface of the present invention is vesicular, much like that of pumice, a porous volcanic rock. Pumice is described as a rock froth formed by vesiculation of liquid lava by expanding gases liberated from solution in the lava prior to and during solidification. Further, the density distribution over a cross-section of the resulting foam layer is essentially constant in all regions of the foam, that is, from the outer surface through the inner core to the substrate. Since no skin is formed on the resulting foam layer, the foam layer is absorbent without the necessity of physically removing the thin outer surface, as is required in skiving.

The substrate may be bonded to the polyurethane foam as the foam is formed, such that the substrate becomes an integral part of the finished article. As such, the substrate may be selected to specifically impart a variety of characteristics. Alternatively, the substrate may be a release surface so that an unsupported layer of foam is produced.

DETAILED DESCRIPTION OF THE DRAWINGS

Figure 1:
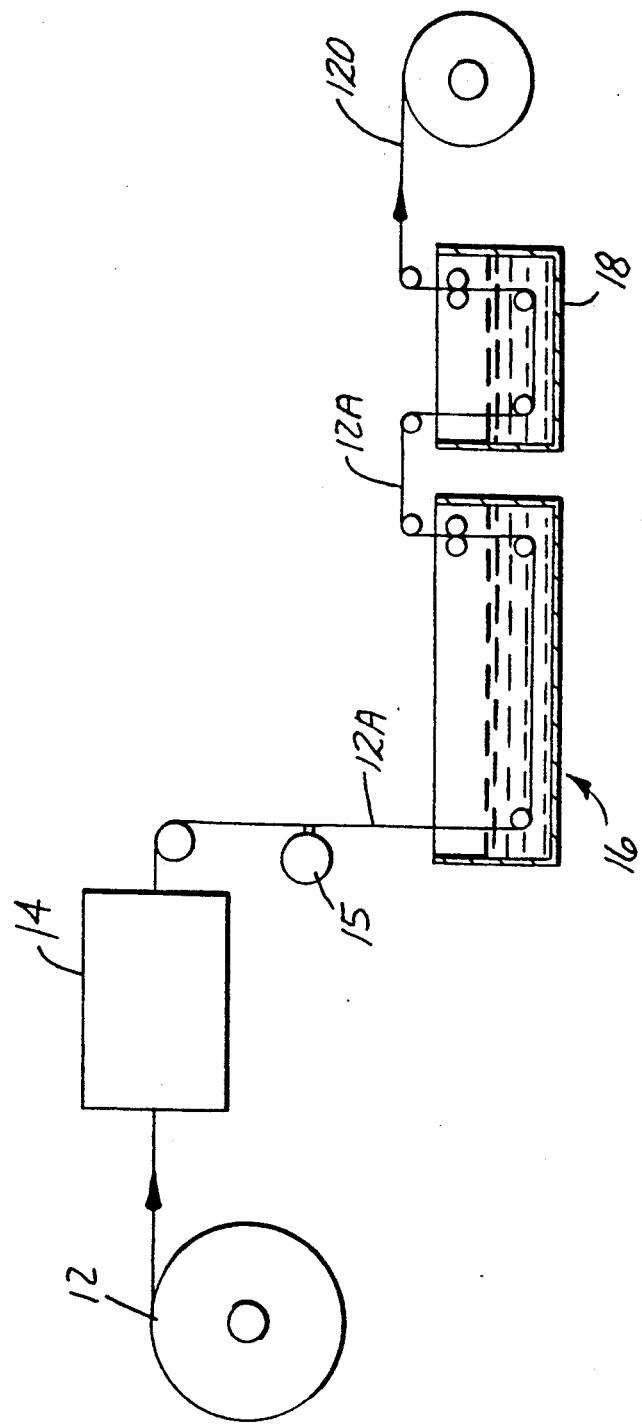
FIG. 1 is a schematic representation of an apparatus including a liquid bath used in the practice of the present invention.

FIG. 1 is a schematic representation of a typical process set-up for practicing the present invention. Substrate 12 is provided from a roll or any other appropriate delivery means. Substrate 12 is coated by coating means 15 with a metered amount of reaction mixture. Coated substrate 12A is immersed, coating-side down into a first liquid bath 16. The reaction mixture is immersed in first liquid bath 16 for a time sufficient to effect reaction of the reaction mixture. Once the reaction is complete, coated substrate 12A is removed from first liquid bath 16 and immersed into a second liquid bath 18. Second liquid bath 18 is typically water and may be optional. Rinsed, reacted, and coated substrate 120 is removed from second liquid bath 18 and may be further processed and packaged for the consumer. In addition to the examples of substrate 12 listed herein below, reacted, coated substrate 120 may be used, wherein the finished article has a thin layer of foam on both sides of the original uncoated substrate 12.

Optionally, substrate 12 may be screen printed, embossed, or otherwise processed at a point schematically designated at 14, without interferring or limiting the present invention. Alternatively, substrate 12A may be screen printed, embossed, or otherwise processed at a point after the reaction mixture has reacted.

Figure 2A:
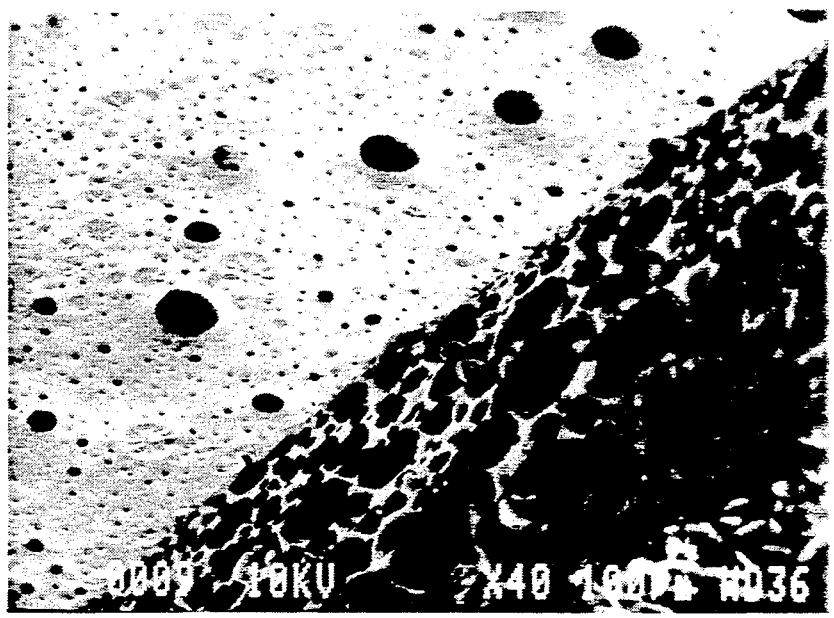
FIGS. 2A through 9B are scanning electron microphotographs (SEMs) of foam materials outside the scope of the present invention.

FIGS. 2a and b are two SEMs at 40× and 60× magnification, respectively of a sulfopolyurethane prepolymer formed by conventional air environment foaming. The darker side of the sample is a cut area where the edges of the exposed cells lie within a single plane; that is, the cut edges of the exposed cells lie in a flat, planar configuration of only two dimensions.

Figure 3A:
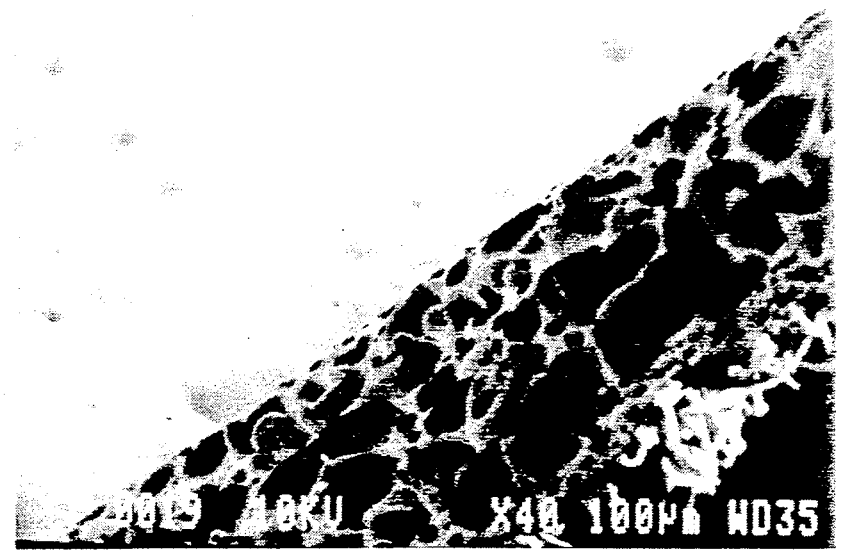

FIGS. 3a and b are two SEMs at 40× and 60× magnification, respectively of a polyurethane foam derived from isocyanate capped polyoxyethylene polyol reactants in conventional air environment foaming. The darker side of the sample is a cut area where the exposed pores lie in a two dimensional plane.

Figure 4A:
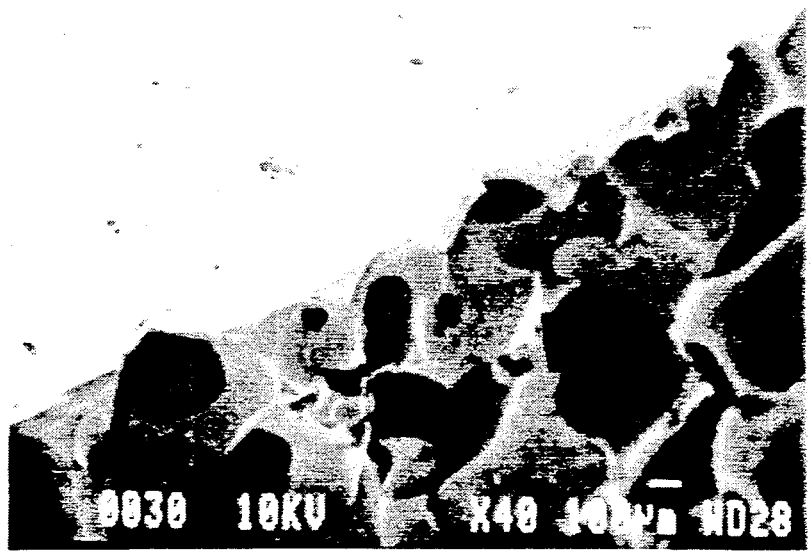
Figure 4B:
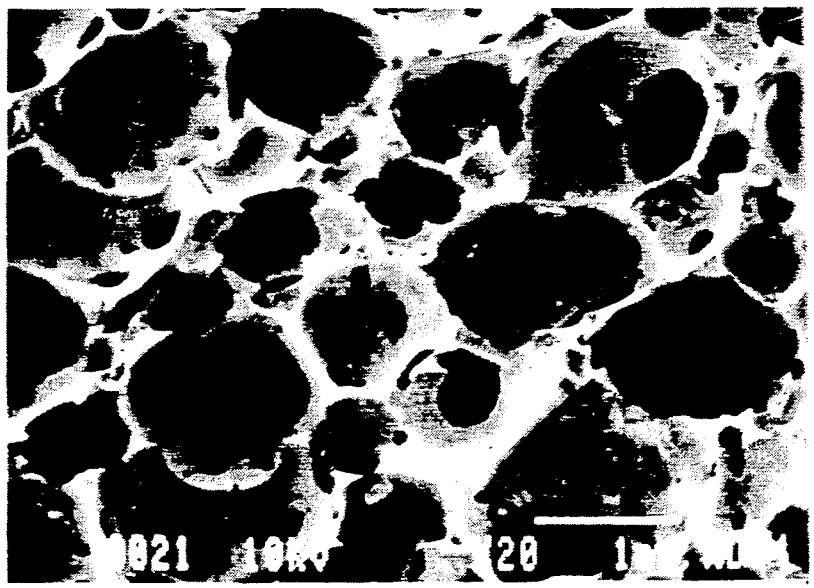

FIGS. 4a and b are two SEMs at 40× and 60× magnification, respectively of a polyurethane foam derived from Trepol TM prepolymer by conventional foaming in a mold. The skin comprises a high percentage of the film surface, and the cross-section displays the exposed pores which lie in a two dimensional plane.

Figure 5A:
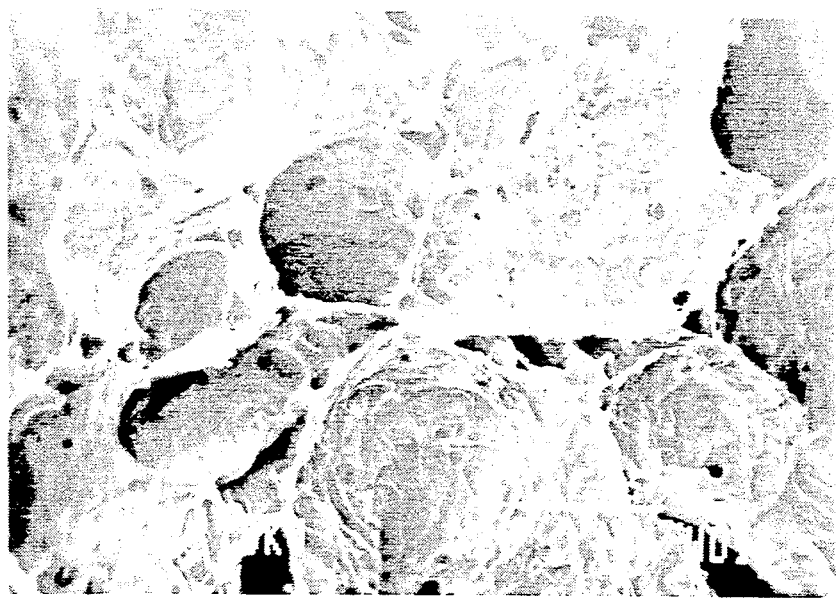
Figure 5B:

FIGS. 5a and b are two SEMs of a commercially available sponge article, Scotch-Brite TM Cellulose Sponge. The sponge is formed from cellulosic polymers by a conventional viscose process. The microphotographs are at 20×, and 200× magnifications, respectively.

Figure 6A:
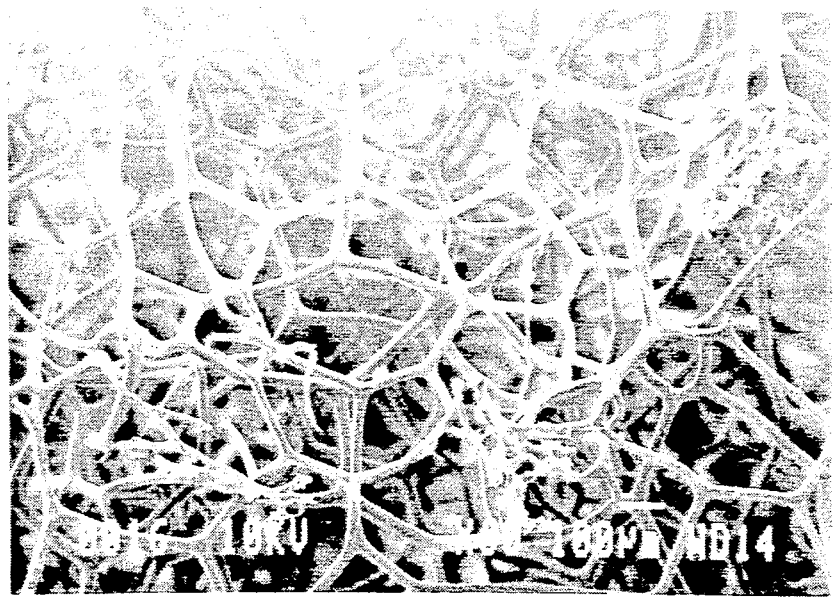
Figure 6B:
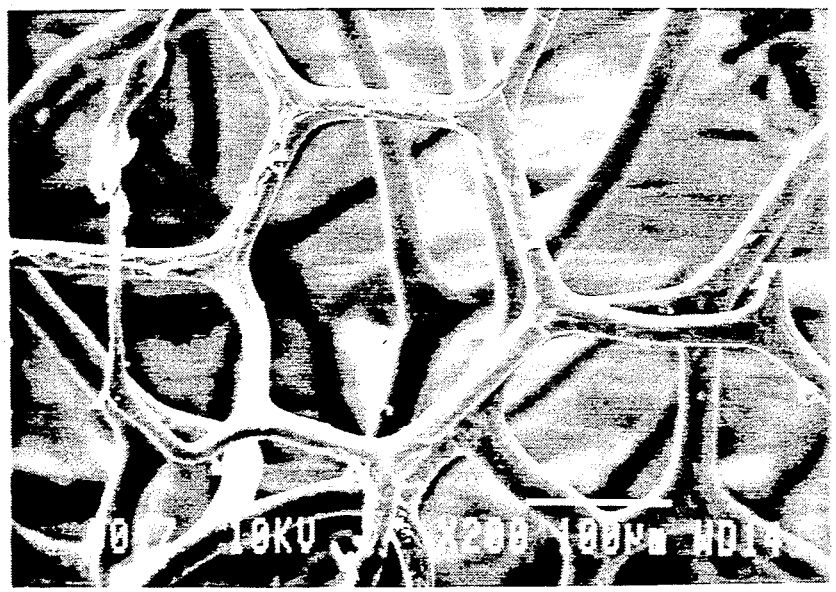

FIGS. 6a and b are two SEMs at 60× and 200× magnification, respectively of a natural sea sponge. The SEMs illustrate rod-like connecting elements with a somewhat fuzzy surface. The rods tend to maintain a regular thickness over the length of the individual rods.

Figure 7A:
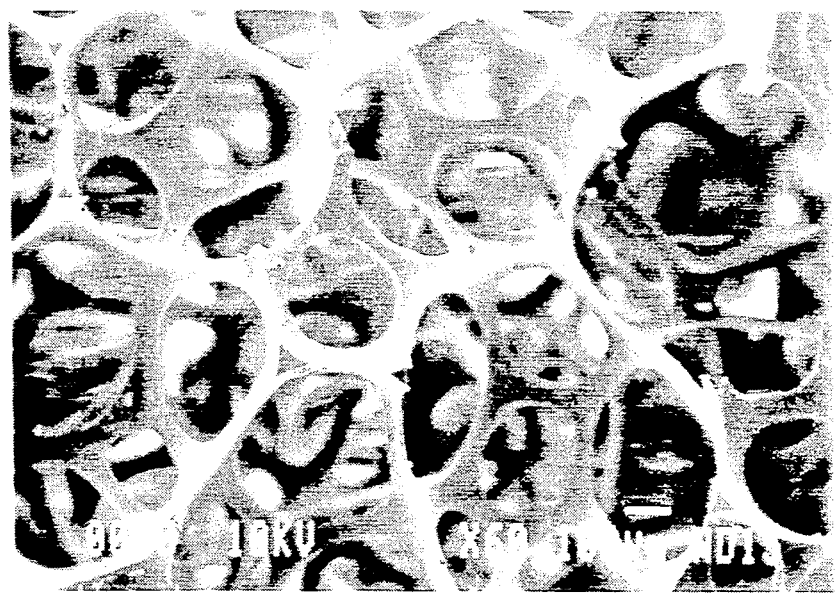
Figure 7B:
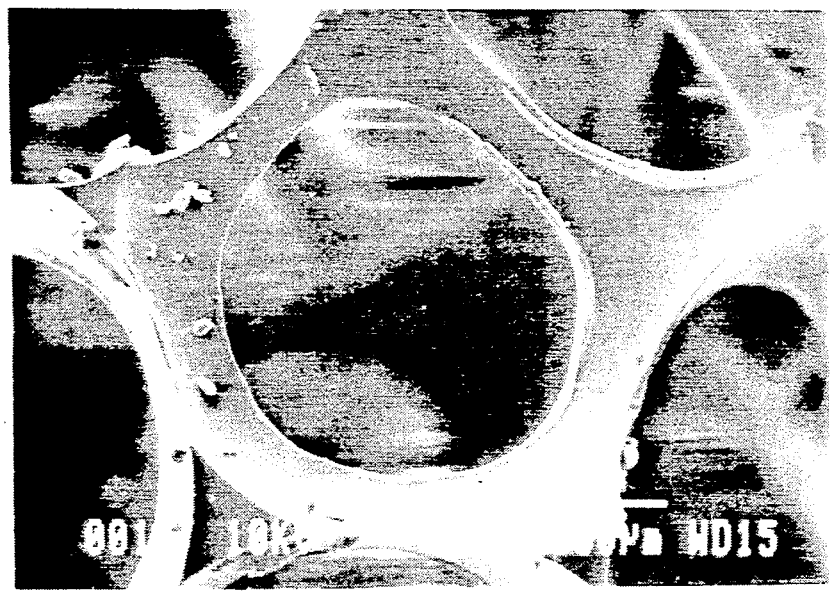

FIGS. 7a and b are SEMs of a reticulated polyurethane foam. The foam was formed by a process for reticulating polyurethane foam. The openings are fairly uniform in size and shape. The openings tend to be roughly circular or elliptical. The connecting members that define the openings tend to be smooth on their surface.

Figure 8A:
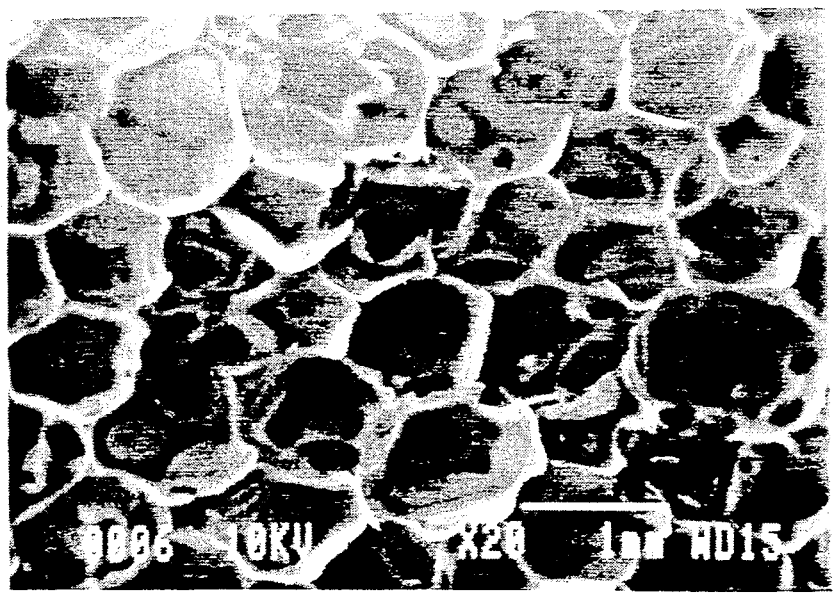
Figure 8B:
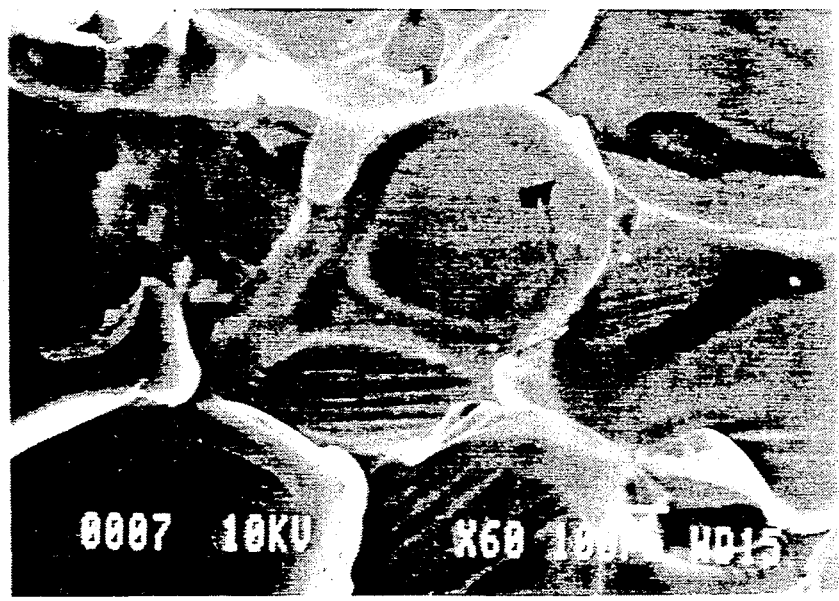

FIGS. 8a and b are two SEMs at 20× and 60× magnification, respectively of a closed-cell polyurethane foam. The cell walls connect the support members of the foam structure.

Figure 9A:
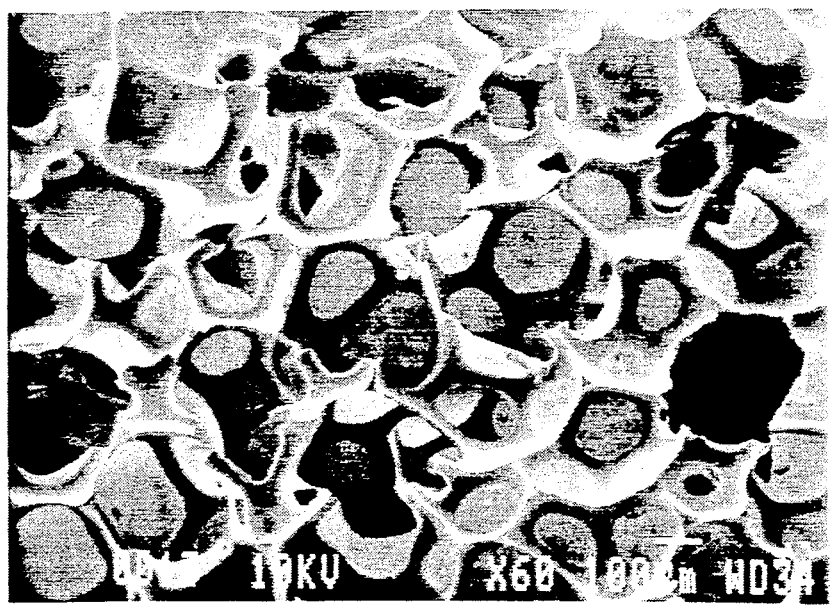
Figure 9B:
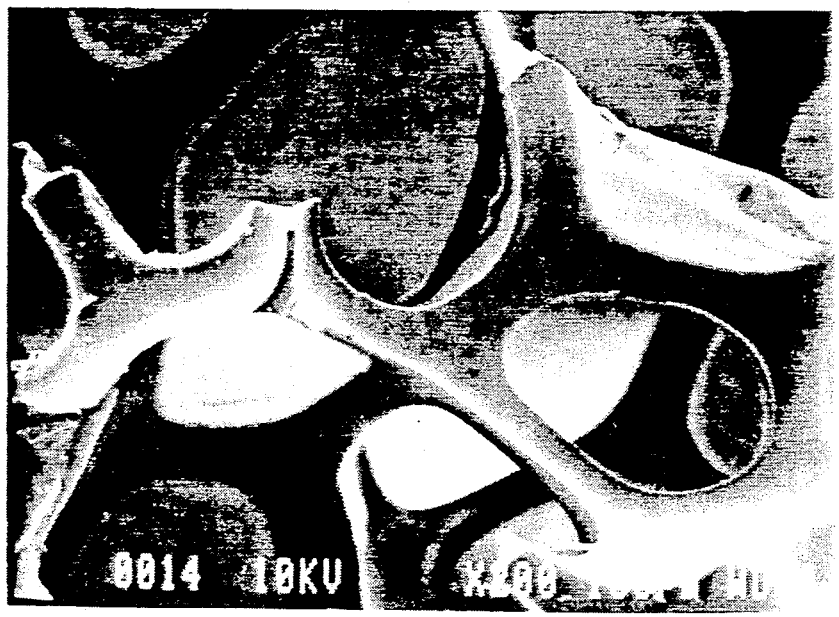

FIGS. 9a and b are two SEMs at 60× and 200× magnification, respectively of an open-celled polyurethane foam. The structural members of the foam are smooth, and fairly regular in their dimensions. The pore size and cavity sizes and shapes tend to be fairly uniform.

Figure 2B:
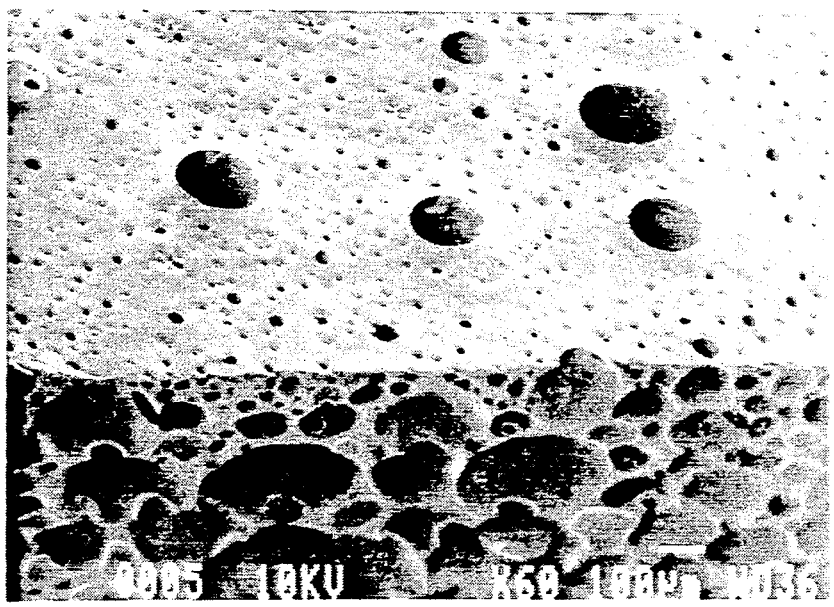
Figure 3B:
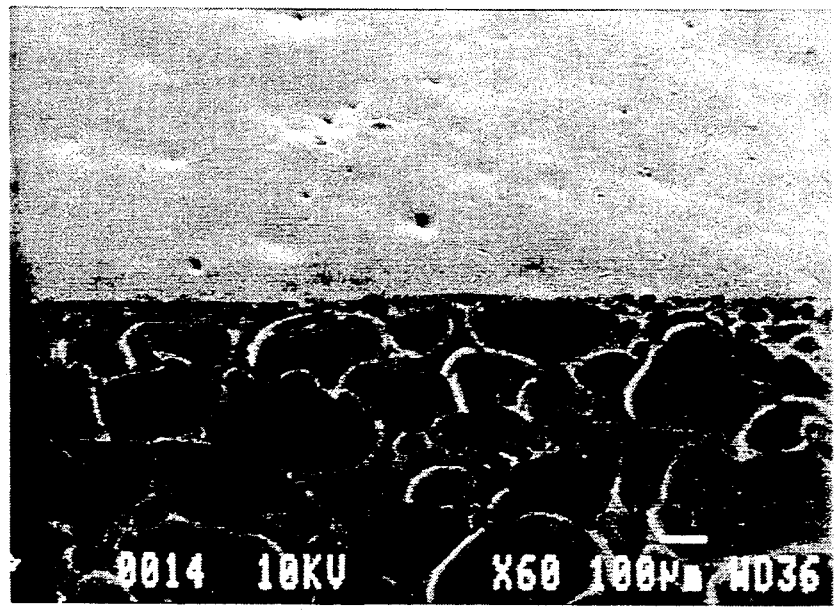
Figure 10A:
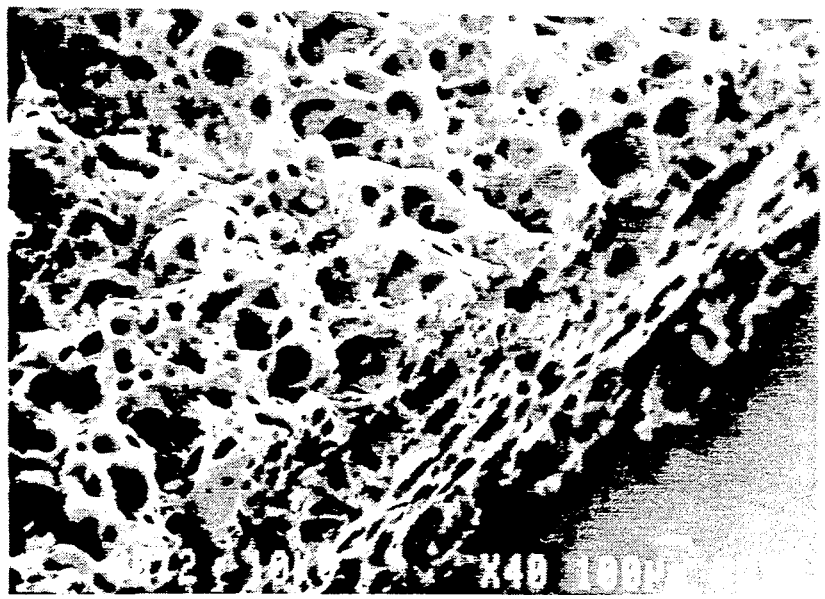
FIGS. 10A through 12B are SEMs of foam materials made according to the present invention.

FIGS. 10a and b are SEMs of a skinless foam formed from a sulfopolyurethane prepolymer according to the immersion foaming process of the present invention at 40× and 200× magnification, respectively. The surface is highly three-dimensional. Abundant vesicles, holes, pores and other openings characterize the structural morphology. The vesicles are not as uniform in size and shape as those shown in conventional foaming. (See FIGS. 2 and 3)

Figure 11A:
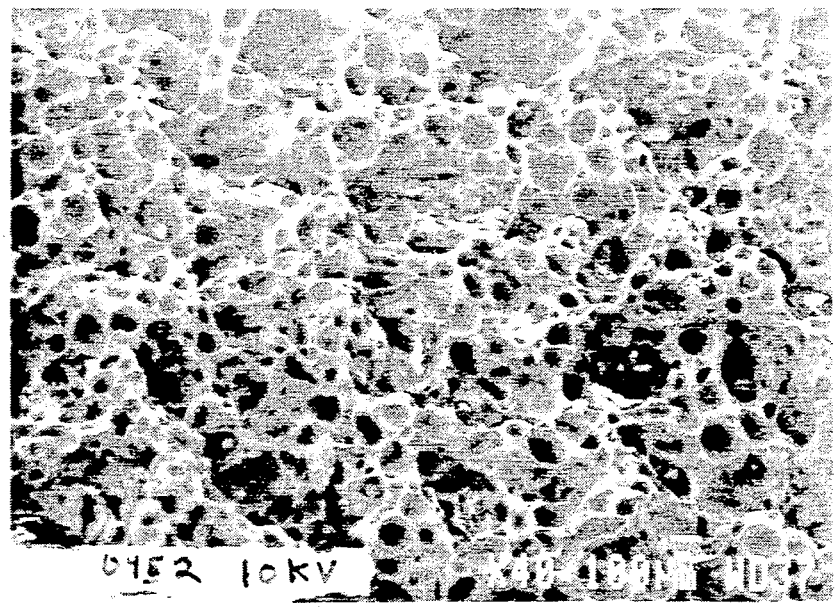

FIGS. 11a and b are two SEMs of a skinless foam formed from an isocyanate endcapped polyoxyethylene polyol prepolymer at 40× and 100× magnification, respectively made according to the immersion foaming process of the present invention. The surface is highly three-dimensional. Abundant vesicles, holes, pores and other openings characterize the structural morphology. The vesicles are not as uniform in size and shape as those shown in conventional foaming. (See FIGS. 2 and 3).

Figure 12A:
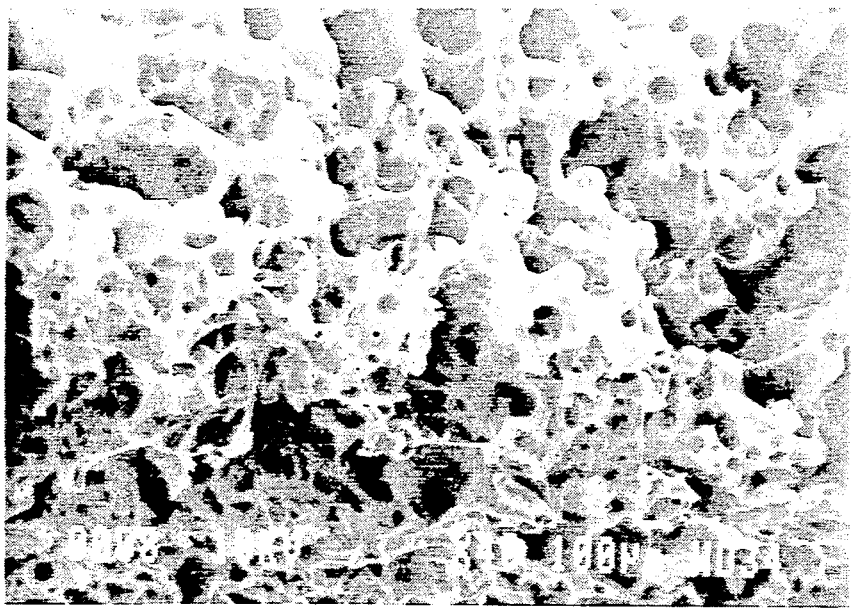
Figure 12B:
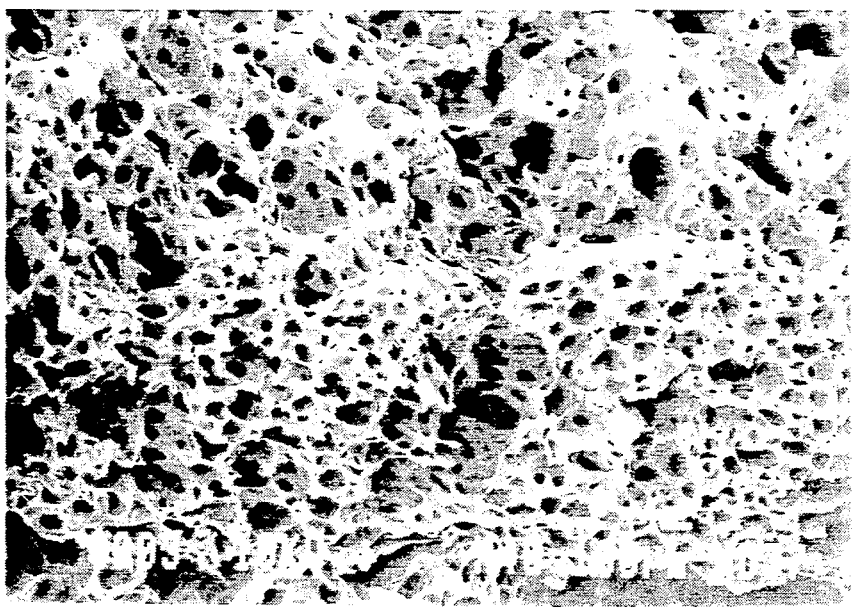

FIGS. 12(a) and (b) are two SEMs of a skinless foam made according to the immersion foaming process of the present invention, using an optional frothing step. FIG. 12a is the SEM of a skinless foam wherein the optional frothing was achieved by bubbling an inert gas through the reaction mixture. FIG. 12b shows a foam wherein the optional frothing was achieved by high speed mechanical stirring.

In this application:

"polyurea-urethane" is the general term used to characterize the polymer of the skinless foam materials of the invention. It is intended that the term includes polymers containing urea, urethane, biuret, allophanate, and the like groups that may be formed on the reaction of polyisocyanates with water and the elimination of carbon dioxide. Such a reaction provides urea groups but there can also be biuret groups. Urethane groups will be present from polyol endcapped with polyisocyanates and can be formed by reaction of the polyisocyanate and polyols that may be in the feed to the reaction mixture.

"reactive surface" is the surface that permits penetration of the liquid bath into the reaction mixture mass.

"skin" is the higher density outer surface of a foam article, see *A Glossary of Urethane Industry Terms* (1971).

"vesicular" is a texture characterized by abundant vesicles formed as a result of the expansion of gases. The term refers to the surface of the foam as well as the interior structures. The term is based on the geological definition of pumice, a rock froth formed by expansion of gases during solidification of molten lava.

DETAILED DESCRIPTION OF THE INVENTION

This invention relates to foams, articles containing said foams and the method for making said foams and articles.

The preferred embodiment of the article of the present invention comprises at least two layers, wherein the first layer is a substrate and the second layer is a skinless foam. The skinless foam layer may comprise either a single or multiple coatings of the reaction mixture, sequentially applied and reacted. An additional feature of the present invention, is the ability to add as many additional layers of substrates and foam, skinless or conventionally processed as desired. The demarcation between the coating layers formed by the present invention is essentially indistinguishable, when each of the layers is processed similarly. The order of layering is variable and the layers may be added for support, reinforcement, strength, abrasiveness, aesthetics, etc.

For example, an article of the present invention may comprise a substrate layer, a first skinless foam layer on one side of the substrate layer and a second foam layer on the other side of the substrate. The second foam layer may be produced by the process of the present invention, as well as being produced by conventional foaming processes. Another example would include an article comprising multilayers of foam, such that each layer is a different color. Still another example could include an article comprising multilayers of foam, and having a detergent or cleaner impregnated layer as an inner layer. It is also within the scope of the present invention to have an article comprising a substrate, a first layer of foam produced by conventional foaming processes and a second layer of skinless foam as produced by the present invention.

Alternatively, an article within the scope of the present invention comprises a first substrate layer, a skinless foam layer, and a second substrate layer. The second substrate layer should be sufficiently porous or absorbent to permit penetration of the liquid bath through the substrate, wherein the liquid bath has access to the reactive surface of the reaction mixture. It is further within the scope of the present invention, that during the reaction process, the skinless foam, as it is formed could seep through a porous second substrate, such as a scrim or reinforcing net, and essentially embeds the second substrate in the skinless foam.

The foam, a polyurea/urethane formed from components in the reaction mixture may adhere to the substrate, physically penetrating the substrate and becoming mechanically locked thereto or by chemically reacting with the substrate. The resulting foam has a highly porous surface structure that is absorbent and is substantially without an outer layer skin. In appearance the skinless surface of the present invention is vesicular, much like that of pumice, a porous volcanic rock. Pumice is described as a rock froth formed by vesiculation of liquid lava by expanding gases liberated from solution in the lava prior to and during solidification. Further, the density distribution over a cross-section of the resulting foam layer is essentially constant in all regions of the foam, that is, from the outer surface through the inner core to the substrate. Since no skin is formed on the resulting foam layer, the foam layer is absorbent without the necessity of physically removing the thin outer skin, as is required with conventional foams.

For an article comprising multilayers of foam of the present invention, each layer may exhibit a cross-section density distribution that differs from layer to layer. The density distribution of the multilayers would closely approximate a step-like change of density between the layers, but each layer would be consistent within the layer. On the other hand, an article having multilayers of conventionally processed foam, would exhibit a cross-sectional profile of alternating layers of foam and skin. Alternatively, a skiving step, which removes the skin layer would be necessary between coating passes to eliminate the skin layers in the cross-sectional profile.

Substrates suitable for the practice of the present invention include, but are not limited to paper, coated paper, porous or non-porous thermoplastic films, plain or embossed, metallized thermoplastic films, woven and non-woven materials such as wet- or air-laid wood fiber, entangled polymer fiber, binder reinforced fibrous substrate or thermally-bonded polymeric fiber, foams, cellulose, regenerated cellulose material. The substrate may be planar, textured or even three-dimensional. Substrates suitable as the second, porous or absorbent substrate include, but are not limited to scrim or other reinforcing fabrics, open wire mesh, reticulated structures, open weaves, open knits or absorbent materials that allow substantial contact of the bath with the reactive surface.

A process for forming a skinless foam article comprises:

1) providing a reaction mixture, said mixture containing an isocyanate-terminated polyurethane prepolymer;

2) optionally frothing said reaction mixture;

3) depositing a metered portion of said reaction mixture onto a substrate;

4) immersing said coated substrate into a first liquid bath, said first bath containing water and a catalyst for the polyurea-urethane foaming reaction of the components in said reaction mixture with water such that a skinless foam is formed on said substrate;

5) removing said foam and substrate from said first bath; and 6) optionally, immersing said foam and substrate in a second bath.

An alternative embodiment of the article of the present invention comprises at least one layer of skinless foam. The skinless foam layer may comprise either a single coating of reaction mixture or multiple coatings of the reaction mixture, sequentially applied and reacted. An additional feature of the present invention is the inclusion of a substrate layer, wherein the substrate layer is porous and permits penetration of the liquid bath through the substrate, such that the liquid bath has access to the reactive surface of the reaction mixture. The skinless foam, as it is produced seeps through the porous substrate, such as a scrim or reinforcing net and essentially embeds the substrate in the skinless foam. Suitable substrates include, but are not limited to scrim or other reinforcing fabrics, open wire mesh, reticulated structures, open weaves, open knits or other open materials that allow substantial contact of the bath within the reactive surface.

The substrate may be a release surface, that is a low adhesion surface, so that a product that consists essentially of foam is formed. The release surface may be continuous or porous, to allow the liquid bath to penetrate readily to the backside of the mass. Silicone or silicone treated release surfaces including, for example a reuseable processing line belt may be readily used to this end.

The foam, a polyurea/urethane formed from the components in the reaction mixture will not adhere to the low adhesion surface.

The process for forming a skinless foam article on a releasable surface according to the invention comprises the steps of:

1) providing a reaction mixture, said mixture containing an isocyanate-terminated polyurethane prepolymer;

2) optionally frothing said reaction mixture;

3) depositing a premeasured portion of said reaction mixture onto a releasable surface;

4) immersing said coated surface into a first liquid bath, said first bath containing water and a catalyst for the polyurea-urethane foaming reaction of the components in said reaction mixture with water such that a skinless foam is formed on said surface;

5) removing said skinless foam from said first bath; and 6) optionally, immersing said skinless foam in a second bath.

The substrate may be selected, not only for composition, but also for its physical characteristics, such as appearance, strength, absorbency, flexibility, texture, abrasiveness and the like. For example, the substrate selected may be a material commercially known under the trade name of "Scotchbrite TM ." Such a substrate would afford an article with strength, flexibility and varying degrees of abrasiveness, depending on the initial abrasiveness of the Scotchbrite TM substrate selected. Alternatively, a substrate may be selected that will impart a polishing non-scratching surface.

Textured-surface substrates are also useful in the practice of the present invention. For example, an embossed surface substrate may be selected. Coating a textured substrate with the reaction composition could produce an article that is textured on one side (substrate side) and a smooth appearing foam on the other side (due to a thick enough coating of reaction mixture to obscure the substrate's texture). Alternatively, the reaction mixture could be coated thinly enough that the substrate's texture is mimicked or even exaggerated when the foaming reaction is completed.

Other variations of substrates may include printing the substrate with an ink, for example solvent-based, water-based, or soy-based inks, such that the printed image is incorporated into the reacted foam. It is also within the scope of the present invention to coat with the reaction mixture, a three-dimensional object, for example a plastic toy.

The reaction mixture may be coated on a substrate using knife coating, screen, die, roll, curtain, gravure, or spray coating or any other coating techniques known to those in the art. The preferred methods include die and screen coating. Typically coating weights are, preferrably in the range of 1 $g/m^2$ to 1000 $g/m^2$/per pass. The coating processes may result in a continuous coat or a discontinuous coat.

The backbone component of the polyurea-urethane used in the reaction may comprise any well known materials or newer materials effective in reacting with isocyanate or isocyanate groups to form polyurethanes. Preferred classes of materials are oligomers or prepolymers containing groups that are reactive with isocyanates, such as polyurea prepolymers, polyol prepolymers, and sulfopolyurethane prepolymers. U.S. Pat. Nos. 4,638,017 and 4,738,992 describe sulfopolyurethane prepolymers, that tend to be highly hydrophilic. The sulfopolyurethane prepolymers generally are preferred. Various other prepolymers that fall within the generic classes described above and are included in some of the literature references and patent reference materials cited, include, but are not limited to polydiisocyanate-capped diols of a) polytetramethylene oxide, b) polypropylene oxide, and c) polycaprolactone.

As taught therein, sulfonated reactants are used in otherwise conventional polyurethane, polyurea, and biuret forming processes to produce hydrophilic foam compositions from isocyanate terminated, for example, intermediates of polyurethane, polyurea, or polyurea-urethane. The final composition contains polyurethane or polyurea linkages, but there may be urethane groups and some biuret linkages or other polymeric linkages.

The preferred skinless polyurea-urethane foams prepared in the present invention have backbone polymer units derived from a reaction of polyisocyanate terminated compounds selected from monomeric or polymeric polyols and polyamines having an average molecular weight of 60 to about 10,000. Formula I represents such backbone units:

and optionally, the backbone is represented by Formula II

wherein

W is one or more monomeric or polymeric polyvalent organic groups having a valence of $b+1$, in which b is an integer of 1, 2, or 3, selected from $R^1$ and $R^2$ in which $R^1$ is the polyvalent residue of an aliphatic or aromatic polyol or polyamine, or an aliphatic or aromatic polyether, polyester, or polyamide polyol or polyamine having the formula

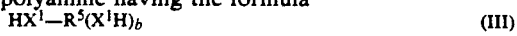

in which $R^5$ preferably is selected from one or more of (1) polyvalent aliphatic linear groups having 2 to 12 carbon atoms and carbocyclic aliphatic and aromatic groups having 5 to 20 carbon atoms and (2) one or more of polyvalent chains of divalent units selected from aliphatic linear groups —$C_nH_{2n}$—, in which n is an integer of 2 to 12, and 5- and 6-membered aliphatic and aromatic carbocyclic groups having 5 to 20-carbon atoms separated by individual

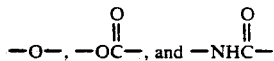

groups;

$R^2$ is a divalent sulfogroup containing group

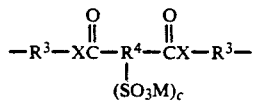 (IV)

in which $R^3$ is the same as $R^1$ but has a molecular weight of about 300 to 5,000, $R^4$ is an arenepolyyl group (polyvalent arene group) having a valence of c+2 having 6 to 20 carbon atoms or an alkanepolyyl (polyvalent alkane) group having 2 to 20 carbon atoms remaining after the removal of two carboxyl groups and c sulfo groups from sulfoarene and sulfoalkane dicarboxylic acids having the formula

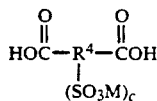 (V)

in which M is a cation, and preferably M is at least one of Na, but M can be H, an alkali metal ion, such as K or Li, an alkaline earth metal cation Mg, Ca, or Ba, or a primary, secondary, tertiary, or quaternary ammonium cation such as ammonium, methylammonium, butylammonium, diethylammonium, triethylammonium, tetraethylammonium, and benzyltrimethylammonium cation, and c is an integer of 1, 2, or 3;

R is one or more organic groups having a valence of a+1 that is the residue of a polyisocyanate having a+1 isocyanate groups selected from linear and branched aliphatic groups having 2 to 12 carbon atoms and 5- and 6-membered aliphatic and aromatic carbocyclic groups having 5 to 50 carbon atoms;

X is independently —O—, —NH—, or

$X^1$ is independently —O— or —NH—; and
a is an integer of 1, 2, or 3.

Using conventional air environment foaming processes taught in U.S. Pat. Nos. 4,638,017 and 4,738,992 produce a skinned polyurethane foam. The conventional air environment foaming process produces a foam with cells and pores that are fairly uniform in size and shape. The openings tend to be roughly circular or elliptical. The connecting members that define the openings tend to be smooth on their surface. The morphology of conventionally processed foams tends to produce geometrically symmetrical cells and generally features a dense, tight skin of low porosity and an interior cellular structure of polyhedron cells. To utilize the hydrophilic features of conventional processed foams, the skin must be removed utilizing a physical removal technique generally referred to as skiving.

The skinless foam of the invention comprises a polymeric convolution of connected passageways and vesicles. Additionally, the foam of the invention does not require skiving, since the process of the present invention does not form a water-resistive or low porosity skin. The process of the present invention is a vigorous reaction that occurs when the prepolymer composition is immersed in water. The foam of the present invention is a haphazard array of polymeric strands and fragments as a result of the reaction ocurring during the process of the present invention. The haphazard array provides a non-uniform, highly textured surface. The foam, broadly appearing to be planar, is a three-dimensional mass of asymmetric intertwining polymeric fragments and strands of varying thicknesses and widths, which outline a tortuous formation of interconnecting open passageways, cavities and pores. Generally, the surface topography features, non-planar smooth round edges and sides, with varying size distributions of both open and thin membrane closed pores, surface ridges and depressions. The cross-sectional morphology, however, is homogenous in that the physical structure or appearance of the upper and lower surfaces are identical or nearly identical to the interior structure of the foam. This is unlike conventionally processed foams, in which the exposed surface is smooth, dense and non-porous unlike the uniform, cellular array of the interior structure of the foam.

The preferred process for preparing skinless polyurea-urethane foams according to the invention comprises the steps:

1. providing a reaction mixture comprising:
  a. isocyanate terminated compounds having the formula

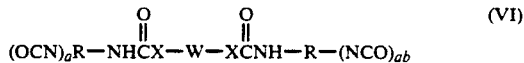 (VI)

wherein R, X, W, a and b are defined above and optionally, b. a polyisocyanate having the formula

 (VII)

wherein R, and a, are as defined above; and
  c. optionally, a surfactant; and
  d. optionally, a catalyst; and
2. optionally, frothing said reaction; mixture;
3. coating the reaction mixture onto a substrate at a coating weight in the range of 1 g/m² to 1000 g/m²/per pass;
4. immersing the coated substrate coated-side down into a liquid bath, wherein the bath contains water and. optionally a catalyst for the reaction of isocyanate functional compounds with water, and optionally contains a surfactant;
5. withdrawing the coated substrate from the liquid bath.

The isocyanate-terminated compounds of Formula VI are prepared by procedures well known in the art by the reaction of one or more polyols or polyamines having the formula $$HX^1-W-(X^1H)_b \qquad (VIII)$$

wherein $X^1$, W and b are defined above with one or more polyisocyanates of Formula VII.

Generally the reaction is carried out using proportions of polyol or polyamine such that the ratio of amine and hydroxyl groups to isocyanate groups is from about 1 to 1 to about 1 to 10. When the average molecular weight of the W group is less than about 500, a ratio of about 1 to 3 is used; when the average molecular weight of the W group is about 500 to 1000, a ratio of about 1 to 4 is used; and when the average molecular weight of the W group is above about 1000 a ratio of about 1 to 5 is used.

Isocyanate-terminated compounds of Formula VI where W is $R^2$, a divalent sulfogroup-containing group of Formula IV, are prepared by a process similar to that described above using a sulfocompound

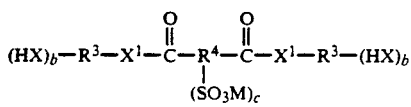

in which $R^3$, $R^4$, X, $X^1$, , M, b and c are described above.

The sulfocompound is prepared by the reaction of one mole of sulfoarene or sulfoalkane dicarboxylic acid (Formula V), with two moles of monomeric or polymeric polyol or polyamine of Formula III having (b+1) groups selected from amino and hydroxyl groups forming a sulfopolyol or sulfopolyamine designated a sulfocompound having 2b hydroxyl and/or amino groups. Sulfoarene or sulfoalkane esters, acid halides or acid anhydrides may be used in the place of their dicarboxylic acids.

As is known in the art, the reaction of isocyanates with polyols can be performed in the presence of a mercury, lead or tin catalyst such as dibutyltin dilaurate. Preferably, the catalyst is a tertiary amine, tricalcium aluminate, or the potassium salt of a molybdenum ester of triethyleneglycol as is disclosed in U.S. Pat. No. 2,916,464. Sulfocompounds are prepared by heating the reactants for about 2 to 20 hours, preferably 4 to 10 hours, at temperatures from 150° to 300° C., preferably 200° to 250° C., under reduced pressure or an inert atmosphere. For the reaction of isocyanates with polyamines, a catalyst is generally not needed.

Polyols that can be used in preparing the backbone polymer of the skinless polyurea-urethane foams of the invention and represented by Formula III and wherein $X^1$ is oxygen, have a molecular weight of 62 to 2000 and include, for example, monomeric and polymeric polyols having two to four hydroxyl groups. Examples of the monomeric polyols include ethylene glycol, propylene glycol, butylene glycol, hexamethylene glycol, cyclohexamethylenediol, 1,1,1-trimethylolpropane, pentaerythritol, and the like. Examples of polymeric polyols include the polyoxyalkylene polyols (i.e., the diols, triols, and tetrols), the polyester diols, triols, and tetrols of organic dicarboxylic acids and polyhydric alcohols, and the polylactone diols, triols, and tetrols having a molecular weight of 106 to about 2000. Examples of polymeric polyols include polyoxyethylene diols, triols and tetrols such as the Carbowax TM polyols (Union Carbide), the polyoxytetramethylenediols, such as Polymeg TM polyols (Quaker Oats Company), the polyester polyols, such as the Multron TM poly(ethyleneadipate)polyols (Mobay Chemical Company), and polycaprolactone polyols, such as the PCP TM polyols (Union Carbide).

Examples of aromatic polyols include polyester polyols prepared from aromatic dicarboxylic acids such as o-, m-, and p-phthalic acid and excess diols, such as diethylene glycol, triethylene glycol, glycol, glycerine, and pentaerythritol; and from dicarboxylic acids, such as adipic acid and aromatic polyols, such as resorcinol. Examples of monomeric aromatic polyols include resorcinol and o-, m-, and p-xylene-$\alpha,\alpha'$-diols.

Polyamines of Formula III wherein $X^1$ is —NH— have an average molecular weight of 60 to 6000 and include monomeric and polymeric primary and secondary aliphatic and aromatic amines having two to four amino groups. Examples include alkylene diamines such as ethylenediamine, triethylenetetraamine, diethylenetriamine, piperazine, as well as other polyamines such as the polyamine family including monoamines, diamines and triamines available from Jefferson Chemical Co., Inc., a subsidiary of Texaco, Inc., under the trade name Jeffamine TM such as Jeffamine TM M-600, M-1000, M-2005, and M-2070 (polyoxyethylene/polypropylene monomers, having an average molecular weight of about 600 to about 2,000); Jeffamine TM D-230, D-400, D-2000, and D-4000 polyoxypropylene diamines having a molecular weight of about 230 to about 4000; Jeffamine TM T-403, T-3000, and T-5000 (polyoxypropylene triamines having an average molecular weight of about 400 to 5000); and Jeffamine TM ED-600, ED-900, ED-2001, ED-4000, and ED-6000, (polyoxyethylene diamines having an average molecular weights of about 600 to about 6000). In addition, hydrazino compounds such as adipic dihydrazide or ethylene dihydrazine can be used, as well as, alkanolamines such as ethanolamine, diethanolamine, and tri(hydroxyethyl)ethylenediamine. Polymeric polyols and polyamines that have a molecular weight of about 300 to 1000 are preferred.

Generally, the reaction mixture used in the process for preparation is provided by the reaction of a polyisocyanate of Formula VII with a polyol or polyamine of Formula VIII utilizing ratios of equivalents of isocyanate groups in the polyisocyanates to equivalents of amino and hydroxyl groups in the polyamines and polyols in the range of about 0.5/1 to 10/1, preferably about 2/1 to 5/1.

Sulfoarene- and sulfoalkanediacarboxylic acids of Formula V useful for preparation of the polyurea/urethane foams of the invention are any of the known sulfoarene- and sulfoalkanedicarboxylic acids. Examples of these include sulfoalkanedicarboxylic acids, such as sulfosuccinic acid, 2-sulfoglutaric acid, 2,5-disulfoadipic acid, 2-sulfododecanedioic acid, sulfoarenedicarboxylic acids such as 5-sulfonaphthalene-1,4-dicarboxylic acid, 4,5-disulfonaphthalene-1,8-dicarboxylic acid, sulfobenzylmalonic acids such as those described in U.S. Pat. No. 3,821,281, and sulfofluorenedicarboxylic acids such as 9,9-di(2'-carboxyethyl)fluorene-2-sulfonic acid described in British Patent No. 1,006,579. It is understood that the corresponding lower alkyl esters, halides, anhydrides, and salts of the above sulfonic acids can also be used in the preparation.

Polyisocyanates, represented by Formula VII, that can be used to react with the polyols and polyamines of Formula VIII, to form the isocyanate-terminated compounds of Formula VI that are intermediates to the polyurea-urethane foams of the invention are any of the well known polyisocyanates. Preferred polyisocyanates are hexamethylene diisocyanate, toluene diisocyanate, isophorone diisocyanate, 3,5,5-trimethyl-1-isocyanato-3-isocyanatomethylcyclohexane, 4,4'-diphenylmethane diisocyanate (MDI), 4,4'4"-triisocyanatotriphenylmethane, and the polymethylenepolyphenylisocyanates. Other polyisocyanates are well known and include but are not limited to those described in U.S. Pat. Nos. 3,700,643 and 3,600,359. Mixtures of polyisocyanates can also be used, such as the mixture of MDI and trimer of MDI available from Dow Chemical as Isonate 2143L TM "Liquid MDI".

In addition to their use in the preparation of the compounds of Formula VIII, the polyisocyanates of Formula VII can be used as the optional polyisocyanates in step (b) of the process for making the foams of the invention. It is also within the scope of the present invention to add up to 2 weight percent water with the polyisocyanate in step (b). The addition of water creates urea linkages and increases the viscosity of the reaction feed.

It is preferable that the reaction mixture in the preparation of the polyurea-urethane foams of the invention contain a surfactant. Alternatively, the surfactant may be added to the liquid bath, in an amount sufficient for the reaction to proceed.

Preferably, the surfactant is in the range of 1 to 15% by weight of the isocyanate-terminated compounds in the reaction mixture, and more preferably in the range of 5 to 10% surfactant. Typical surfactants include but are not limited to those containing polyalkylene oxide groups, for example, Pluronic TM, a nonionic block copolymer of propylene oxide and ethylene oxide, (BASF), and Igepal TM nonionic nonylphenoxypoly(ethyleneoxy)ethanols, (GAF); Tetronic TM, tetrafunctional block copolymers of ethylene oxide, propylene oxide, and ethylenediamine, (BASF); Triton TM X-100, a nonionic octylphenoxy polyethoxyethanol, (Rohm and Haas); sulfonate surfactants, for example, Ultrawet TM, a sodium linear alkylate sulfonate, (Arco); Dowfax TM, anionic alkylated diphenyl oxide disulfonate, (Dow); Stepanol TM, sodium lauryl sulfonate, (Stepan); silicon surfactants, for example, DC193, a nonhydrolyzable silicone, (Dow Corning); Silwet TM L-720, a polyalkylene oxide modified methylpolysiloxane, (Union Carbide); glycol and alcohol surfactants, for example, Surfonyl TM 61 and 104, acetylenic alcohols or glycols, (Air Products).

A large variety of functional adjuvants can be added to either the liquid bath, or mixed directly into the prepolymer coating formulation reaction mixture, or separately coated on the substrate in an additional process step or in some combination thereof. The choice of addition is dictated to some extent by the degree of incorporation (efficiency) of the adjuvant into the resulting foam material. Functional adjuvants that may be admixed with the reaction mixture or added to the liquid bath, include but are not limited to, co-reactants such as polyfunctional polyols and polyamines intended for chain extending or crosslinking the polyurethane/urea foam. Processing aids include surfactants, cell regulators, solvents, thickeners, blowing agents, etc. Other useful adjuvants known in the art include but are not limited to fillers and fibers such as diatomaceous clays, inorganic fillers, nylon, cellulose, rayon, or polypropylene, and fragrances, deodorants, enzymes, medicinals, insecticides, fungicides, antimicrobials, humectants, pigments, dyes, abrasive particles, encapsulated fragrances, or flame retardants. Addition of fibers, abrasive particles, cleaners and solvents, such as acetone into the processing and/or composition of the foam wipe are within the scope of the present invention.

According to the process of the present invention the reaction mixture is applied to a substrate by a coating means. Said substrate is then moved through a liquid bath such that the composition is on the lower side of the substrate. The gases generated in the reaction provides a buoyancy to the composition that keeps the composition in contact with the substrate. The liquid bath is typically water. However, when the reaction mixture contains a surfactant, surfactant concentration in the bath due to extraction from the reaction mixture can increase up to 30% or more.

Although the process may proceed without a catalyst, it is preferred that the liquid bath contain a catalyst to accelerate the reaction of the isocyanate groups with water. Alternatively, a catalyst may be added to the reaction mixture.

A catalyst-containing solution used in the bath may be comprised of an aqueous solution, dispersion, or other form of aqueous carrying medium for the catalyst capable of acting on an isocyanate-polyol reaction as well as the isocyanate-water reaction. Even though the bath in a continuous process does not chemically convert the catalyst, thereby lowering the concentration of catalyst, some catalyst may be carried out of the bath with the removed foam. Some replenishment of the catalyst to the bath may be required to maintain the preferred catalyst concentration.

The catalyst, when present in the liquid bath, is in a catalytically effective amount. Generally, the catalyst is used in concentrations of from 0–25% by weight of the liquid bath, with a preferred range, between 2 and 15% by weight, and a more preferred range between 5 and 10% by weight. The preferred catalyst is N-ethylmorpholine.

Catalysts useful in the present invention are well-known in the art and include, but are not limited to any water-dispersible or water soluble catalyst. If the catalyst is not soluble in water, a dispersing agent, usually a surfactant, may be used to enable dispersion of the catalyst within the liquid bath. Examples of catalysts include amine catalysts, such as N-ethylmorpholine, dimethylaminoethanol, triethylenediamine, bis-(2-dimethylaminoethyl)ether, N-N-dimethylaminoethyl-morpholine, pentamethyldiethylenetriamine, 2,2'-dimorpholinyl dialkyl ether isopropyl ether; metal catalysts such as stannous octoate, dibutyl tin dilaurate, mixtures of metal catalysts and organic acids, as described in U.S. Pat. No. 3,808,162, and mixtures of any of the above. Commercially available catalysts that are marketed under the following trade names are also useful: Dabco TM (WT, TL, DF, and 8264) (Air Products), Polycat TM (41 and 91) (Air Products), and Thancat TM (DD and DPA) (Texaco).

Typically, the temperature of the liquid bath is sufficiently above room temperature to allow the reaction to take place at a reasonable commercial speed. However, at the lower temperature the reaction will proceed at a slower pace and may be catalyst dependent. Generally, temperatures in the range of 15°–100° C. are used and preferably, in the range of 40°614 85° C., and more preferably in the range of 55°–70° C.

As previously noted, surfactants are desirable in assisting dispersion of non-water soluble catalysts. Surfactants in the bath, in addition to that in the reaction mixture have been found to improve the hydrophilic properties of the foam. Furthermore, they are useful in changing the physical appearance or structure of the foam. Surfactants can be added to the bath in concentrations of 0.1 to 5% by weight or more. However, since surfactant is leached from the reaction mixture, a surfactant need not be added separately to the bath, since the concentration of the surfactant can increase as the process proceeds upwards to 30% or more. Typically, the concentration of surfactant in the bath is held to about 1 to 5% by addition of water to the bath.

In the reaction process, it is preferred that the reaction mixture on the substrate remain immersed in the liquid bath for an effective time period that allows a large proportion of the isocyanate groups have reacted. Typical time periods are in the range of 0.5 seconds to 10 minutes or more, preferably in the range of 5 seconds to 4 minutes. After the reaction mixture has been reacted, the article is removed from the liquid bath. The article is typically immersed in a second bath for rinsing. The second bath may contain only water or water and an effective amount of acid to neutralize any amine remaining in the article.

Once the reaction mixture has been prepared, an optional step of frothing the mixture prior to coating the substrate may be included. The frothing step includes, but is not limited to, vigorously stirring the reaction composition using a high speed mechanical stirrer to aerate the mixture, or bubbling a dry nonreactive gas, such as nitrogen, $CO_2$ or air through the mixture. Alternatively, a blowing agent may be added to the reaction mixture. Blowing agents that may be useful in the practice of the present invention include $C_1$ to $C_8$ hydrocarbons, $C_1$ and $C_2$ chlorinated hydrocarbons such as methylene chloride, dichloroethane, trichlorofluoromethane, dichlorodifluoromethane, chlorotrifluoromethane, tetrafluoromethane, dichlorofluoromethane, fluoroform, 1,1,2-trichloro-1,2,2-trifluoroethane, 1,2-dichlorol-1,1,2,2-tetrafluoroethane, chloropentafluoroethane and hexafluoroethane.

These and other aspects of the invention will become apparent in the following examples. However, these examples are merely for illustration purposes and should in no way be construed to limit or otherwise restrict the scope of the present invention. All materials used in the examples are commercially available, unless otherwise stated or apparent.

PREPARATION EXAMPLE P1

Step (a) A one liter flask was fitted with a mechanical stirrer, nitrogen purge, condenser and receiver for condensate. The flask was charged with 1.0 moles (600 grams) ethyleneoxide polyol (Carbowax 600 TM, Union Carbide, Danbury, Conn.), 0.25 moles (74.0 grams) dimethyl sodium 5-sulfoisophthalate (previously dried above 100° C. in a vacuum oven), and 100 grams toluene. The flask was heated in a Woods metal bath to 103° C. to distill toluene and thus dry the reactants. When all of the toluene was removed, the reactants were heated to 200° C. at which time 0.2 gram $Zn(OAc)_2$ was added (0.03 wt. %). The temperature was raised to 245° C. for a period of 4 hours, at which time the pressure was reduced to 1 mm for 30 to 60 minutes. Hot resin was then poured into dry containers and capped under dry $N_2$ to prevent absorption of water. The OH equivalence of this diol was typically approximately 465 grams/mole of OH as determined by the NCO method.

Step (b) A two-liter flask was fitted with mechanical stirrer, addition funnel, dry nitrogen purge, and oil bath heating. The flask was charged with 479.0 grams of a mixture of 4,4',-diphenylmethane diisocyanate-based polyisocyanates (Isonate 2143L TM, Dow Chemical, Midland, Mich.), and 0.57 gram (0.06 wt. %) ethanesulfonic acid (this acid was introduced slowly with rapid stirring). The temperature of this mixture was raised to 60° C., at which time the addition of 465.0 grams of the sulfodiol prepared in Step (a) was begun; the addition lasted approximately one hour, at a rate allowing a maximum exotherm of 80° C. When addition was complete the reaction was held at 70° C. for 2 hours, at which time the resin was poured into predried containers under dry $N_2$. An isocyanate-terminated sulfopolyurethane having a typical NCO equivalent of 385 grams/mole NCO was produced.

COMPARATIVE EXAMPLE C1

One hundred grams of isocyanate-terminated sulfopolyurethane prepolymer (as prepared in Example P1), were weighed into a 400 ml beaker. In a separate 250 ml beaker, 47 grams of deionized water were mixed with 1.25 grams of nonionic alkyl phenyl polyether alcohol surfactant (Pluronic TM L-44), 0.275 gram N-ethyl morpholine catalyst and 0.25 gram of a water dispersible pigment (Aurasperse TM Blue W-4123). The isocyanate-terminated prepolymer and aqueous premix containing the catalyst, surfactant and pigment were mixed together with a high speed mechanical stirrer for approximately twenty seconds. The mixture was immediately knife-coated (2 mm gap) onto an air-laid wood pulp substrate (Bridgetex TM, basis wt. 55 g/m$^2$). Carbon dioxide generation from the reaction of the isocyanate mixture and water formed a thin open-cell foam with an outer skin. The resulting foam was oven-cured for 24 hours at 50° C. See FIGS. 2A-2B.

COMPARATIVE EXAMPLES C2

In a 250 ml beaker, 60 grams of isocyanate-capped sulfopolyurethane prepolymer (Hypol TM 4000) were premixed with 7.5 grams acetone, 0.75 gram Pluronic TM L-44 and 0.15 gram Aurasperse TM Blue W-4123 pigment. 60 grams of deionized water were added to the premix. The mixture was vigorously stirred for approximately 10 seconds. The reactive mixture was immediately knife-coated (2 mm gap) onto a Bridgetex TM air-laid wood pulp substrate (basis wt. 55 g/m$^2$), then cured for 24 hours at 50° C. in a forced air oven. The resulting foam exhibited an open-cell structure with a tight outer surface skin. See FIGS. 3A-3B.

EXAMPLE 1

Figure 10B:
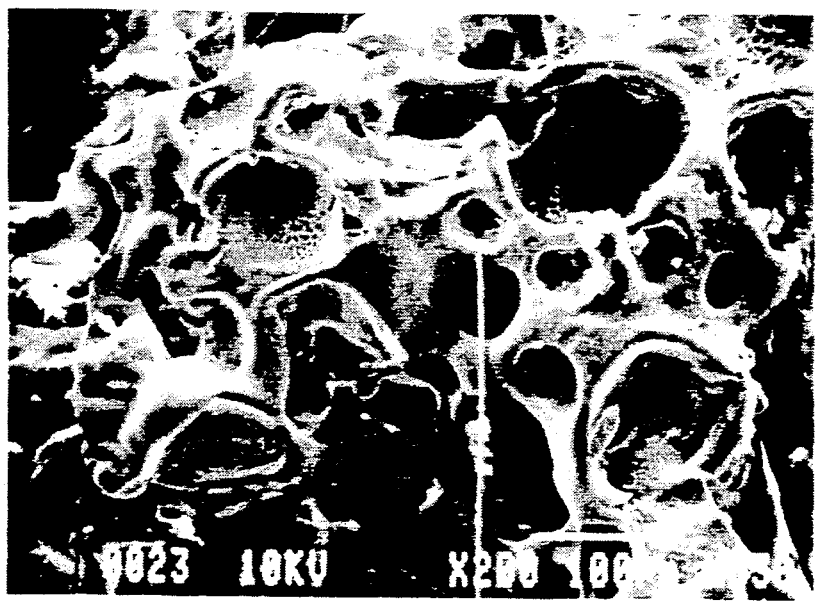

In a 400 ml beaker, 100 grams of isocyanate-terminated sulfopolyurethane prepolymer (as prepared in Example P1) were mixed with 5 grams of nonionic alkyl phenyl polyether alcohol surfactant (Pluronic TM L-44) and 2 grams of a water-dispersible pigment (Aurasperse TM Blue W-4123). The reaction mixture was coated onto a Bridgetex TM aid-laid wood pulp substrate (basis wt. 55 g/m$^2$) using a No. 40 Meyer rod. The coated substrate was immediately immersed, coated-side down, into a bath containing 5 wt. % N-ethylmorpholine in water heated to 65° C. Reaction of the isocyanate functional prepolymer in the heated liquid bath was instantaneous, producing a thin foam with a highly porous non-skinned surface. Six minutes following immersion, the sample was removed, rinsed in water, padded to remove excess water, then the uncoated side was coated and reacted in a similar manner as described above. The sample was cured for 24 hours at 50° C. in a forced air oven. See FIGS. 10A-10B.

EXAMPLE 2

Figure 11B:
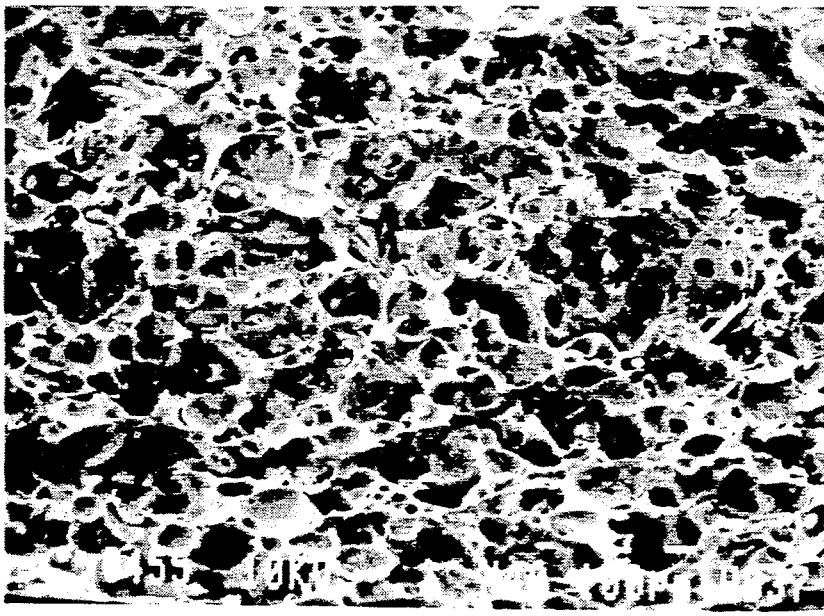

Identical to Example 1 except 100 grams of isocyanate-terminated sulfopolyurethane prepolymer were replaced with 100 grams of Hypol TM 4000 urethane prepolymer (W. R. Grace). The resulting thin foam displayed a porous non-skinned surface. See FIGS. 11A-11B.

TEST PROCEDURES

Procedure for Conditioning Samples

Foam samples (10.16 cm×10.16 cm are immersed in 22.2° C. tap water. The samples are squeezed while under water to remove excess air, and allowed to soak for minutes. The samples are then wrung out using a wringer equipped with rubber rollers. The rinsing procedure is repeated 8 times in tap water, followed by two rinse cycles in deionized water.

PROCEDURE FOR MEASUREMENT OF WET-OUT RATE 1 ml of deionized water (22.2° C.) is delivered from a pipette to the surface of a dry conditioned foam sample. The time is measured from placement of the water until complete disappearance of the water into the foam. The result is expressed in sec/ml.

PROCEDURES FOR MEASURING % WET WIPE AND WIPEABILITY (SECONDS TO DRY)

A conditioned sample (10.16 cm×10.16 cm) is immersed in 22.2° C. deionized water, squeezed to remove air, and run through a rubber-rolled wringer. The damp sample is weighed, and the weight recorded as M1. Ten grams of 22.2° C. deionized water are poured onto a clean mirror surface. The sample is used to slowly wipe up the water, using five back-and-forth cycles. The wet sample is re-weighed, and recorded as M2. The sample is run through the rubber-rolled wringer, and used to wipe up any remaining water, in five vertical passes. The time to complete evaporation of any residual moisture from the wipe samples is measured, and recorded as T1. The following calculations are made from these measurements:

$$\% \text{ wet wipe} = \frac{M2 - M1}{10} \times 100$$

Wipeability = $T1$

Test Procedures

Procedure for Measurement of Density

A conditioned foam sample (10.16 cm×10.16 cm) is oven-dried at 50° C. for at least four hours. The length (L), width (W), and thickness (T) of the sample are measured in centimeters and recorded. The weight is measured in grams, and recorded as W3. The density (D) is then calculated in grams per cubic centimeters (g/cm³), according to the equation:

$$D = \frac{W3}{L \times W \times T}$$

Procedure for Testing Water Absorption

A conditioned foam sample (10.16 cm×10.16 cm) is immersed in 22.2° C. deionized water, the air squeezed out, and wrung out with a rubber-rolled wringer. The sample is then immersed in 22.2° C. tap water, allowed to soak for 30 seconds, and then removed from the water in a horizontal orientation. The wet sample is weighed, and this weight recorded as the absorption weight without dripping, W1. The sample is wrung out, re-immersed in 22.2° C. tap water, and removed from the water in a vertical orientation. Water is allowed to drain for 30 seconds, and the sample is weighed. This weight is recorded as the absorption weight with dripping, W2. The sample is passed through the rubber-rolled wringer, and its length (L), width (W), and thickness (T) are measured and recorded. The sample is oven-dried for at least 4 hours at 50° C., and then weighed. The oven-dried weight is recorded as W3. From these measurements, the following calculations are made:

$$\text{Absorption without dripping } A1 = \frac{W1 - W3}{L \times W \times T}$$

$$\text{Absorption with dripping } A2 = \frac{W2 - W3}{L \times W \times T}$$

$$\% \text{ water loss} = \frac{A1 - A2}{A1} \times 100$$

TABLE 1A

| Example No. | Prepolymer | Process |
|---|---|---|
| C1 | Sulfopolyurethane | Conventional |
| C2 | Hypol TM 4000 | Conventional |
| 1 | Sulfopolyurethane | Immersion |
| 2 | Hypol TM 4000 | Immersion |

TABLE 1B

| Example No. | % Wet Wipe | Wet Out |
|---|---|---|
| C1 | 18.7 | 43 mins |
| C2 | 4.7 | 25 mins |
| 1 | 91.0 | 6 secs |
| 2 | 99.0 | 14 secs |

EXAMPLE 3

A polypropylene blown melt-fiber (BMF) web, basis weight 110 g/m², was heat-embossed with a "weave" patterned roll. The embossed web was coated with a mixture of 100 grams isocyanate-terminated sulfopolyurethane prepolymer (as prepared in Example P1), 3 grams of pigment Aurasperse TM Yellow W1041, and 15 grams Pluronic TM L-44 using a laboratory knife coater, with an about 10 mil (0.25 mm) coating. The web was placed, coated side down, in a 65° C. bath containing a 5 wt. % aqueous n-ethylmorpholine solution. The resulting sample had a textured foam surface that resembled terry-cloth.

EXAMPLE 4

An embossed polypropylene BMF web, basis weight 60 g/m², was coated on one side with a mixture of 100 grams of isocyanate-terminated sulfopolyurethane prepolymer (as prepared in Example P1), 15 grams of Pluronic TM L-44, 3 grams of Aurasperse TM Yellow W1041, using a laboratory knife coater with about 30 mil (0.76 mm) coating. The coated substrate was reacted in the liquid bath, rinsed, and cured overnight at 50° C. The opposite side of the substrate was then coated with a thin layer of the prepolymer mixture (as prepared in Example P1), using a wire-wound #60 Meyer rod. The wet coating was sprinkled with plastic particles (12-20 grade, U.S. Technology Corp). To insure adhesion, a cardboard core was rolled, with pressure, across the particulate side of the web. The coating was allowed to air-cure at room temperature for two hours, before finishing the reaction in a 65° C. catalyst bath. The resulting web had an absorbent foam wiping side, and a scrubbing side consisting of the imbedded plastic particulate.

EXAMPLE 5

A 60 g/m$^2$ embossed polypropylene BMF web was coated under the same conditions as described in Example 4 on one side with the prepolymer/surfactant/pigment mixture of Example 4; reacted, rinsed, and cured. The opposite side was then laboratory knife coated under the same conditions as described in Example 4 with the same prepolymer mixture as prepared in Example P1. The sample was then reacted, rinsed, and cured overnight at 50° C.

The following mixture was prepared:
500 g Rohm & Haas Binder HA-16 TM
1 g GR-5 TM Wetting Agent (Rohm & Haas)
28 g 50/50: N$_4$OH/H$_2$O
30 g 3:1 (50/50: ASE TM 60/H$_2$O):(50/50: ASE 90/H$_2$O) (Rohm & Haas)
11 g 50/50: Antifoam TM B/H$_2$O (Dow Corning)
500 g FA300 Fine Polyester Powder #b 9839 (Kodak) Aurasperse TM Green #W-6013 (Harshaw Chemical Co.) (*Note: ASE is a polyacrylate thickener)

This mixture was screen-printed on the thin foam side of the above web, using a 1.6 mm hole rotary screen, with a 1.6 mm gap between the screen and the web. The samples were cured in a 120° C. oven. The resulting article had an absorbent foam wiping side, and a scrubbing side consisting of hardened, raised, green dots.

EXAMPLE 6

A Bridgetex TM air-laid wood pulp substrate, basis weight 55 g/m$^2$, was screen printed with an isocyanate-functional prepolymer to form an absorbent, flexible, three-dimensional patterned foam wipe. The coating formulation contained 100 grams of isocyanate-terminated sulfopolyurethane prepolymer (as prepared in Example P1), 15 grams of Pluronic TM L-44 and 3 grams of Aurasperse TM Yellow W1041. A perforated 20 gauge steel screen containing 3.7 holes per square centimeter, (24 holes per square inch) (Catalog model 5/32 inch Staggered Harrington & King Perforating Co., Inc.) was used to screen print the substrates. The screen pattern, was selected to produce discreet dot agglomerates of the prepolymer on the substrate surface when coated.

The wood pulp substrate was screen printed by overlaying a 12"×12" perforated screen on the substrate, spreading the prepolymer formulation across the screen surface with a blade, then lifting the substrate from the screen resulting in transfer of the coating in a replicated pattern. The coated substrate was immediately immersed coated side down, in a temperature controlled bath containing a 5 wt. % aqueous n-ethylmorpholine solution heated to 65° C. Reaction of the prepolymer was instantaneous. Formation of discreet foam domains on the surface of the substrate allowed for retention of the inherent flexibility of the substrate due to the discontinuous nature of the foam coating. Ten minutes following immersion, the sample was removed, rinsed in water, padded to remove excess water, then cured 4 hours at 50° C. in a forced air oven. The resulting sample was absorbent, displayed a three-dimensional patterned surface, and was highly flexible both in a dry and wet state.

Preparation Example P2

Step (a) A one liter flask was fitted with a mechanical stirrer, nitrogen purge, condenser and receiver for condensate. The flask was charged with 1.0 moles (1000 grams) ethyleneoxide polyol (Carbowax 1000 TM, Union Carbide, Danbury, Conn.), 0.25 moles (74.1 grams) dimethyl sodium 5-sulfoisophthalate (previously dried above 100° C. in a vacuum oven), and 100 grams toluene. The flask was heated in a Woods metal bath to 103° C. to distill toluene and thus dry the reactants. When all of the toluene was removed, the reactants were heated to 200° C. at which time 0.32 gram Zn(OAc)$_2$ is added (0.03 wt. %). The temperature was raised to 245° C. for a period of 4 hours, at which time the pressure was reduced to 1 mm for 30 to 60 minutes. Hot resin was then poured into dry containers and capped under dry N$_2$ to prevent absorption of water. The OH equivalence of this diol was typically approximately 705 grams/mole of OH as determined by the NCO method.

Step (b) A two-liter flask was fitted with mechanical stirrer, addition funnel, dry nitrogen purge, and oil bath heating. The flask was charged with 576.0 grams of a mixture of 4,4,-diphenylmethane diisocyanate-based polyisocyanates (Isonate 2143L TM, Dow Chemical, Midland, Mich.), and 0.77 gram (0.06 wt. %) ethanesulfonic acid (this acid was introduced slowly with rapid stirring). The temperature of this mixture was raised to 60° C., at which time the addition of 705.0 grams of the sulfodiol prepared in Step (a) was begun; the addition lasted approximately one hour, at a rate allowing a maximum exotherm of 80° C. When addition was complete the reaction was held at 70° C. for 2 hours, at which time the resin was poured into predried containers under dry N$_2$. An isocyanate-terminated sulfopolyurethane having a typical NCO equivalent of about 430 grams/mole NCO was produced.

EXAMPLE 7

Airtex TM 352 air-laid wood pulp substrate, basis weight 79 g/m$^2$ available from James River Corporation, was coated with the sulfopolyurethane propolymer (as prepared in Example P2). The sulfopolyurethane prepolymer was mixed with 10 wt. % of Pluronic TM L-44 and 0.4 wt. % of Zulu Blue 4863 pigment. The reaction mixture was applied to the substrate at a coating weight of 194 g/m$^2$ using a coating die. The substrate was moved through the catalyst bath at a speed of 1.5 meters per minute (m/min) with an immersion time of approximately 150 seconds. The liquid catalyst bath contained 7 wt. % N-ethylmorpholine in water and was heated to 52° C. Upon exiting the catalyst bath, the thin foam wipe was rinsed in water, then wringer squeezed to remove excess water and catalyst, and wound up. Side 2 of the substrate was subsequently coated and reacted in a second coating pass to produce a two-side coated thin foam sample having a total coat weight of 387 g/m². The sample was rinsed in water and cured for three hours at 65° C.

EXAMPLE 8

A two-side coated thin foam wipe identical to Example 7 was prepared except thermal bonded polypropylene nonwoven fabric (Spec 258, James River Corporation, basis wt. 33.5 g/m²) was substituted for the Airtex TM 352 air-laid wood pulp substrate.

EXAMPLE 9

Airtex TM 395 air-laid wood pulp substrate, basis weight 97 g/m² available from James River Corporation was coated with the sulfopolyurethane prepolymer (as prepared in Example P2). The substrate was coated with a mixture of the sulfopolyurethane prepolymer, 5 wt. % of Pluronic L-44 TM surfactant and 0.4 wt. % Zulu Blue 4863 pigment. Substrate coating weight was 145 g/m² per coating pass. The substrate was moved through the catalyst bath at a speed of 1.5 m/min. The 55° C. catalyst bath contained 5 wt. % n-ethylmorpholine in water. Both sides of the wood pulp substrate were coated in separate coating passes producing a thin two-side coated sample with a total coat weight of 291 g/m².

EXAMPLE 10

A two-sided coated thin foam wipe identical to Example 9 was prepared except the coating weight per side per pass was changed from 145 g/m² to 242 g/m².

EXAMPLE 11

A two-side coated foam sample identical to Example 9 was prepared except in this example the samples were processed using multiple coating passes, that is, two coating passes per side at a coating weight application of 194 g/m² per pass. With the second pass, the coating was applied directly onto the thin foam formed from the immersion foaming of the first coating pass. The sample was dried between the first and second coating passes. Total coat weight resulting from the four coating passes (two passes per side) was 775 g/m².

coated substrate was immediately immersed, coated side down, into a bath containing 5 wt. % n-ethylmorpholine in water heated to 65° C. Five minutes following immersion, the sample was removed, rinsed in water, padded to remove excess water, then the reverse side coated in a similar manner as described above. Coat weight was measured at 196 g/m². The sample was cured for 24 hours at 50° C. in a forced air oven. The test results of the sample are shown in Table 3.

EXAMPLE 13-17

Airtex TM 395 air-laid wood pulp substrate, basis weight 97 g/m² available from James River Corporation, was coated with the sulfopolyurethane prepolymer (as prepared in Example P2). The sulfopolyurethane prepolymer was mixed with 5 wt. % Pluronic TM L-44 and 0.4 wt. % Zulu Blue 4863 pigment, and additionally aerated with dry nitrogen. The frothed (aerated) reaction composition was applied to the substrate using a coating die. Feed rate of the frothed composition to the coating die was constant at 120 g/min., while the substrate speed through the bath was varied incrementally, (1.5, 1.8, 2.1, 2.4 and 2.7 m/min.) to vary coat weight. The liquid catalyst bath contained 5 wt. % n-ethylmorpholine in water and was heated to 55° C. Upon exiting the catalyst bath, the thin foam wipe was rinsed in water, then wringer squeezed to remove excess water and catalyst, and wound up. Side 2 of the substrate was subsequently coated in a second coating pass to produce two-side coated thin foam wipes which varied in coating weight (254, 283, 325, 379 and 435 g/m², respectively, Examples 13-17). The samples were rinsed in water and cured for three hours at 65° C. The test results of the samples are shown in Table 3.

EXAMPLE 18

In a 400 ml beaker, 100 grams of isocyanate-terminated sulfopolyurethane prepolymer (as prepared in Example P2) was admixed with 10 grams of Pluronic TM L-44 surfactant and 0.4 grams of Zulu Blue 4863 pigment. The isocyanate terminated prepolymer, surfactant and pigment mixture was subsequently aerated

TABLE 2

| Example No. | Density (g/cm³) | Wet Wipe (%) | Wipeability (Seconds) | Wet Out (Seconds) | Abs/vol w/o Dripping (g/cm³) | Abs/vol w/ Dripping (g/cm³) |
| --- | --- | --- | --- | --- | --- | --- |
| 7 | .173 | 98.3 | 87 | 16.1 | .855 | .552 |
| 8 | .121 | 98.1 | 160 | 29 | .718 | .425 |
| 9 | .185 | 98.5 | 18 | 13.7 | .691 | .546 |
| 10 | .151 | 98.9 | 9.3 | 33.5 | .674 | .551 |
| 11 | .187 | 98.3 | 170+ | 6.8 | .682 | .451 |

EXAMPLE 12

In a 400 ml. beaker, 100 grams of isocyanate-terminated sulfopolyurethane prepolymer (as prepared in Example P2) was mixed with 10 grams of Pluronic TM L-44 surfactant and 0.4 grams of Zulu Blue 4863 pigment. The isocyanate terminated prepolymer, surfactant and pigment mixture was subsequently aerated using a high speed mechanical stirrer to froth the reaction mixture to approximately 2.5 times its initial volume. Using a 35 mil (0.89 mm) draw down bar, the frothed reaction mixture was coated onto an Airtex TM 352 air-laid wood pulp (James River Corporation). The using a high speed mechanical stirrer to froth the reaction mixture to approximately 2.5 times its initial volume. Using a 45 mil (1.14 mm) draw down bar, the frothed reaction mixture was coated onto an Airtex TM 352 air-laid wood pulp. The coated substrate was immediately immersed, coated side down, into a liquid bath containing both 5 wt. % n-ethylmorpholine and 5 wt. % tris(hydroxymethyl)aminomethane (Tris Amino TM, available from Angus Chemical Co.) in water heated to 65° C. Five minutes following immersion, the sample was removed, rinsed in water, padded to remove excess water and then cured for 24 hours at 50° C. in a forced air oven.

TABLE 3

| Example No. | Density (g/cm³) | Wet Wipe (%) | Wipeability (Seconds) | Wet Out (Seconds) | Abs/vol w/o Dripping (g/cm³) | Abs/vol w/ Dripping (g/cm³) |
|---|---|---|---|---|---|---|
| 12 | .156 | 98.7 | 12.0 | 26.0 | .748 | .655 |
| 13 | .109 | 98.9 | 26.6 | 17.6 | .963 | .583 |
| 14 | .117 | 98.9 | 28.2 | 18.8 | .897 | .561 |
| 15 | .118 | 98.4 | 28.9 | 13.7 | .898 | .569 |
| 16 | .123 | 98.8 | 33.9 | 11.4 | .893 | .577 |
| 17 | .123 | 99.1 | 34.4 | 9.2 | .919 | .602 |
| 18 | .171 | 94.2 | 23 | 8.2 | .879 | .682 |

EXAMPLE 19

Bridgetex ™ air-laid wood pulp substrate (85 g/m² basis weight), 9.2 cm wide, was printed with a solvent-based ink. The sulfopoylurethane prepolymer (as prepared in Example P1) was mixed with 15 wt. % Pluronic ™ L-44 surfactant and 0.45 wt. % Zulu Blue 4863 pigment. Using a coating die, the reaction mixture was applied to the printed side of the substrate, at a coating weight of 235 g/m². The coated substrate was drawn through a 3-meter long, 55° C. liquid catalyst bath, containing 5 wt. % n-ethylmorpholine in water, at a rate of 1.52 meters/minute. Upon exiting the catalyst bath, the foam article was rinsed in water, and squeezed to remove the excess water. The resulting foam sample exhibited the printing, which initially has been applied to the substrate, ultimately incorporated in the foam and appearing on the surface of the foam.

Various modifications and alterations of the invention will become apparent to those skilled in the art without departing from the scope and the principles of this invention and it should be understood that this invention is not to be unduly limited to the illustrative embodiments set forth hereinabove.

We claim:

1. A polyurethane foam comprising a convolution of connected passages and three-dimensional vesicular, porous surface structure, and substantially without an outer layer skin.

2. An absorbent article comprising:
   a) a substrate; and
   b) at least a single layer of polyurethane foam according to claim 1.

3. The article according to claim 2, wherein said substrate is selected from the group consisting of paper, coated paper, porous or non-porous thermoplastic film, metallized thermoplastic film, air-laid wood fiber, wet-laid wood pulp, entangled polymer fiber, binder reinforced fibrous substrate, thermally-bonded polymeric fiber, foam, cellulose, and regenerated cellulose material.

4. The article according to claim 3, wherein said substrate may further include an abrasive surface.

5. The article according to claim 3, wherein said substrate may further include a polishing non-scratching surface.

6. The article according to claim 2, wherein said polyurethane foam adheres to both sides of said substrate.

7. The article according to claim 2, wherein said polyurethane foam further comprises one or more coating layers.

8. A process for producing a skinless polyurethane foam comprising the steps of:
   a) coating a substrate with a reaction mixture capable of reacting to form a polyurethane foam on said substrate;
   b) immersing said coated substrate in a liquid bath, wherein said bath comprises water and has a temperature in the range of 15° C. and 100° C. and further may include a catalyst;
   c) continuing immersion of said coated substrate; and
   d) removing said coated substrate from said bath.

9. The process according to claim 8 wherein said process further comprises the step of frothing said reaction mixture prior to said coating step.

10. The process according to claim 9 wherein said frothing step includes aerating by a mechanical means, or blowing a dry nonreactive gas through said composition mixture.

11. The process according to claim 10 wherein said dry nonreactive gas is selected from a group consisting of nitrogen, carbon dioxide, and air.

12. The process according to claim 9 wherein said frothing step includes admixing a blowing agent with said reaction mixture, wherein said blowing agent is selected from the group consisting of $C_1$ to $C_8$ hydrocarbons, and $C_1$ and $C_2$ chlorinated hydrocarbons.

13. The process according to claim 8, wherein said reaction mixture comprises:
   a) isocyanate terminated compounds having the formula

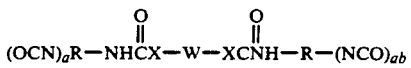

wherein

R is one or more organic groups having a valence of a+1 that is the residue of a polyisocyanate having a+1 isocyanate groups selected from linear and branched aliphatic groups having 2 to 12 carbon atoms and 5- and 6-membered aliphatic and aromatic carbocyclic groups having 5 to 50 carbon atoms;

X is independently —O—, —NH—, or

a is an integer of 1, 2, or 3;

W is one or more monomeric or polymeric polyvalent organic groups having a valence of b+1, in which b is an integer of 1, 2, or 3, and selected from $R^1$ and $R^2$ in which $R^1$ is the polyvalent residue of an aliphatic or aromatic polyol or polyamine, or an aliphatic or aromatic polyether, polyester, or polyamide polyol or polyamine preferably having the formula $HX—R^5(XH)_b$ in which $R^5$ is selected from one or more of (1) polyvalent aliphatic linear groups having 2 to 12 carbon atoms and carbocyclic aliphatic and aromatic groups having 5 to 20 carbon atoms and (2) one or more of polyvalent chains of divalent units selected from aliphatic linear groups, $—C_nH_{2n}—$ and aliphatic carbocyclic groups, $—C_nH_{2n-2}—$, in which n is an integer of 2 to 12 and aromatic groups having 5 to 20 carbon atoms that are separated by individual

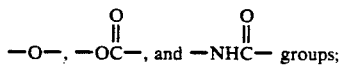
groups;

$R^2$ is a divalent sulfogroup containing group .

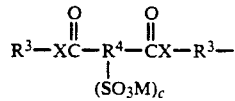

in which $R^3$ is the same as $R^1$ but has a molecular weight of about 300 to 5,000, $R^4$ is an arenepolyyl group (polyvalent arene group) having a valence of c+2 having 6 to 20 carbon atoms or an alkanepolyyl (polyvalent alkane) group having 2 to 20 carbon atoms remaining after the removal of two carboxyl groups and c sulfo groups from sulfoarene and sulfoalkane dicarboxylic acids having the formula

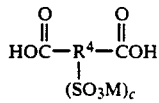

in which M is a cation, and c is an integer of 1, 2, or 3; and b) a polyisocyanate having the formula

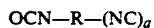

wherein R, and a are as defined in (a).

14. The process according to claim 13, wherein said reaction mixture further comprises a surfactant.

15. The process according to claim 14, wherein at least 0.1% by weight of said catalyst is maintained in said liquid bath.

16. A process for producing an absorbent article comprising:
   a) admixing an isocyanate-terminated polyurethane prepolymer, and a surfactant;
   b) frothing said mixture;
   c) coating a substrate with said mixture;
   d) immersing said coated substrate coating side down in a liquid bath, wherein said liquid bath comprises water and a catalyst; and
   e) removing said coated substrate from said liquid bath.

17. The process according to claim 16, wherein said process further includes reprocessing the product of step (e) on the same side as the first coating layer, from steps (c) to (e), inclusive, wherein the coating weight of said mixture of step (a) is in the range of 1 to 1000 g/m² per pass.

18. The process according to claim 16, wherein said process further includes reprocessing the product of step (e) on the opposite side as the first coating layer from steps (c) to (e), inclusive.

* * * * *

UNITED STATES PATENT AND TRADEMARK OFFICE
CERTIFICATE OF CORRECTION

PATENT NO. : 5,110,843
DATED : May 5, 1992
INVENTOR(S) : Bries, et al

It is certified that error appears in the above-indentified patent and that said Letters Patent is hereby corrected as shown below:

Col. 9, line 5, Delete the dash " - " between "20-carbon"

Col. 11, line 25, Delete one comma "," between $X^1,,M$"

Col. 16, line 39, "COMPARATIVE EXAMPLES C2" should be --COMPARATIVE EXAMPLE C2--

Col. 17, line 20, Insert --2-- between "for minutes"

Col. 19, line 28, Replace "$N_4OH/H_2O$" with --$NH_4OH/H_2O$--

Col. 19, line 32, Replace "#b" with --#--

Col. 26, line 11, Replace "$OCN-R-(NC)_a$" with --$OCN-R-(NCO)_a$--

Signed and Sealed this

Thirty-first Day of August, 1993

Attest:

BRUCE LEHMAN

*Attesting Officer*    *Commissioner of Patents and Trademarks*